2,951,816

POLYMERIZATION CATALYST AND PRODUCTION THEREOF

John Paul Hogan and Robert L. Banks, Bartlesville, Okla., assignors to Phillips Petroleum Company, a corporation of Delaware No Drawing. Original application Mar. 26, 1956, Ser. No. 573,877, now Patent No. 2,825,721, dated Mar. 4, 1958. Divided and this application Jan. 6, 1958, Ser. No. 707,131

13 Claims. (Cl. 252—467)

This invention relates to a catalyst for the polymerization of olefins and an improved method for the preparation of such a catalyst. In one aspect, it relates to the preparation of a catalyst containing hexavalent chromium.

This application is a division of our copending application Serial No. 573,877, filed March 26, 1956, now U.S. Patent No. 2,825,721, which is a continuation-in-part of our applications Serial No. 333,576, filed January 27, 1953, and Serial No. 476,306 filed December 20, 1954, the last two mentioned applications now being abandoned.

It is known that propylene and other low-boiling monoalkylethylenes can be polymerized in the presence of metal halide catalysts to produce polymer products of different viscosities within the lubricating oil range. Polymer products having improved viscosity characteristics have also been obtained by polymerizing monoalkylethylenes in the presence of dissolved aluminum bromide catalyst and catalyst promoter, such as hydrogen bromide, under conditions conducive to maximum growth of polymer chains. By this process, propylene polymer products in 100 percent yield, having a viscosity at 210° F. of 15,000 SUS, or higher viscosities which cannot be measured, have been obtained. More particularly, the desired polymer products are obtained by admixing monoalkylethylenes and aluminum bromide solution in the presence of hydrogen bromide to produce a polymerization reaction mixture as a first step, and thereafter, as a second step, adding monoalkylethylene slowly to the polymerization reaction mixture. The two-step process produced polymer products of higher viscosity than were obtainable by processes previously employed. Prior to this invention, the polymerization of olefins to tacky and solid polymers had not been catalyzed by a highly oxidized metal oxide as the essential catalyst ingredient, even though metal oxide catalysts had been used in catalyzing the polymerization of olefins to liquid polymers, such as propylene dimer and tetramer.

An object of this invention is to prepare a catalyst containing hexavalent chromium. Another object of the invention is to prepare an improved polymerization catalyst. Another object of the invention is to provide an improved method for the preparation of a polymerization catalyst. A further object of the invention is to provide a method wherein a chromium-oxide-containing catalyst is activated under conditions favorable for the existence of hexavalent chromium in said catalyst. Further objects and advantages of the invention will become apparent from a consideration of this disclosure.

In accordance with this invention, polymers, including novel tacky polymeric products and/or solid polymers, are obtained by polymerizing polymerizable olefinic compounds in the presence of chromium oxide associated with at least one oxide selected from the group consisting of silica, alumina, zirconia, and thoria. Solid polymers can be produced from monoolefins and from diolefins. Chromium oxide is an essential catalytic ingredient for the production of high molecular weight tacky and/or solid polymers according to this invention. This catalyst comprising chromium oxide is highly active in polymerizing certain olefins to these heavy polymers. However, its capacity to polymerize olefins to maximum yields of tacky and/or solid polymers appears to be highest in connection with 1-olefins having a maximum of 8 carbon atoms and no branching nearer the double bond than the 4-position. It does polymerize olefins other than those mentioned, but the polymers are preponderantly normally liquid. While the ensuing description deals principally with liquid-phase operation, vapor-phase operation, without a diluent, or with a diluent in liquid phase (so-called "mixed-phase" operation), is effective in producing tacky and/or solid polymer.

Diolefins, e.g., butadiene and isoprene, are among the 1-olefins polymerized to solid polymers over our chromium oxide catalyst. In the case of conjugated diolefins, a methyl group can be closer to a double bond than the 4-position. The diolefin must have at least one terminal double bond. Conjugated diolefins can have small substituents, e.g., $CH_3$, $C_2H_5$, as close as the 3-position to the terminal double bond. Nonconjugated diolefins exhibit the same characteristics as 1-olefins in our process.

The unique polymers according to this invention are characterized by the fact that their unsaturation is preponderantly of the trans-internal or terminal vinyl type. Certain of them are characterized in that their unsaturation is almost entirely of the terminal vinyl structure.

Throughout the specification, it is to be understood that the term "total polymer" as applied to polymers of propylene, designates all polymer boiling above the monomer (but not including any diluent, of course); the semi-solid polymer constitutes the mixture or residuum remaining after distilling off, or otherwise removing, the light oil boiling below about 900° F.; the tacky polymer is the lower molecular weight portion of the semi-solid polymer, which portion can be extracted therefrom with n-pentane at room temperature; and the solid polymer is the higher molecular weight portion of the semi-solid fraction, which constitutes the raffinate or insoluble portion left from the extraction with n-pentane or methylisobutylketone (MIBK). Ethylene polymers according to this invention are composed preponderantly of normally solid material; only small amounts of tacky or liquid polymer are ordinarily produced from ethylene. Polymers of 1-butene, of 1-pentene, and of 4-methyl-1-pentene according to this invention are similar to those of propylene. It will be readily understood by those skilled in the art, however, that the molecular weight distribution in any given polymer will depend upon, not only the polymerization conditions, but the nature of the monomer employed. Thus 1-hexene, 1-heptene and 1-octene ordinarily give relatively low yields of normally solid polymer and relatively high yields of semi-solid, highly viscous, or tacky polymer. However, 4-methyl-1-pentene produces higher yields of solid polymer than does 1-hexene or 1-pentene.

The polymerization of propylene over the catalyst according to this invention yields a total polymer product of about 2000 to 50,000 average molecular weight. The molecular weight of narrow fractions of the polypropylene produced by the process of this invention in the presence of chromium oxide supported on silica, alumina, or silica-alumina range from about 200 to 100,000 or higher. Our polypropylene ordinarily contains about 10 to 20 weight percent of material boiling below 900° F. This fraction is an oil having an initial boiling point of about 400° F. The fraction boiling above 900° F. contains both tacky and solid polymer.

The tacky polymer product is useful in the manufacturing of surgical and pressure sensitive tapes, calking and sealing compounds, laminated paper, hydraulic fluids, tracing paper, electrical capacitors, surface coatings, rubber extenders, etc. Certain fractions of the polymer products are particularly useful as lubricating oil and as V.I. improvers and blending materials for lubricating oils. The solid polymers and copolymers of the invention have utility in applications where solid plastics are used. They can be coated on wire to provide insulation. They can be extruded to form filaments. They can be molded to form articles of any desired shape, for example, bottles and other containers for liquids. They are particularly desirable in these applications on account of their relatively high softening points which make them amenable to sterilization with superheated steam without deformation. They can also be formed into pipe or tubing by extrusion.

The catalyst according to this invention can be prepared by preparation methods known in the art, e.g. direct mixing of solid components, impregnation, etc. In order to obtain optimum activity, it is preferred that the catalyst mixture comprising chromium oxide and the additional oxide as hereinbefore specified be heated under elevated temperature and for a sufficient time to activate, or increase the activity of, said catalyst for the polymerization reaction. It is also preferred that the catalyst be heated under nonreducing conditions in an atmosphere such as oxygen, air, nitrogen, carbon dioxide, helium, argon, krypton, or xenon. Reducing gases such as hydrogen or carbon monoxide can be present in said atmosphere where the time of contact with the catalyst, especially at the higher temperatures, is limited to prevent extensive reduction of the hexavalent chromium; however, the presence of such gases, and of reducing agents in general, is ordinarily not desired. It is ordinarily preferred that the activation atmosphere be nonreducing. It is further preferred that the atmosphere be positively oxidizing, e.g. air or oxygen. The temperature and time of activation can vary over wide ranges and are closely interrelated (so-called "time-temperature effect"), longer times being required at lower temperatures and shorter times at higher temperatures. Catalysts prepared by milling solid silica, alumina, zirconia and/or thoria with solid oxide are activatable at lower temperatures than are catalysts prepared by impregnating silica, alumina, zirconia and/or thoria with an aqueous solution of a chromium compound. As a practical matter, a catalyst prepared by dry mixing is ordinarily activated at a temperature of at least about 350° F. and not substantially greater than about 1500° F. A catalyst prepared by impregnation with an aqueous solution is ordinarily activated at a temperature of at least about 450° F. and not substantially greater than 1500° F. Times of activation can range from about a second at the highest temperatures to 50 hours or more at the lowest temperatures. The stated numerical values are given as illustrative of the most practical ranges and are not absolute limits. By using very short times and higher temperatures, or very long times and lower temperatures, catalysts having various degrees of increased activation are obtainable.

The chromium oxide catalyst can be prepared by impregnation of particulate silica, alumina, or silica-alumina, for example, with a solution of chromium oxide or a compound convertible to chromium oxide by calcination, followed by drying and activation of the composite at a temperature in the range of 450 to 1500° F., preferably 750 to 1500° F., for a period of 3 to 10 hours or more. Activation is conducted by heating in a stream of gas. It is preferred that the gas contain oxygen and be substantially water-free. Preferably the dew point of the activation gas should be below 75° F., preferably below 0° F. However, inert gases, such as carbon dioxide and nitrogen, can be used. It is found that within this activation range of temperature treatment of the catalyst, the character of the polymer can be controlled. When the catalyst is activated at temperatures in the upper part of the range, particularly from 1300 to 1500° F., the polymers obtained from propylene and heavier olefins have a lower average molecular weight and contain less tacky and solid polymer, while activation temperatures in the lower part of the range produce a catalyst which effects an increase in molecular weight of the polymer and the production of larger proportions of heavy tacky and solid polymer. The catalyst can be prepared using, as starting material, chromium trioxide, chromic nitrate, chromic acetate, chromic chloride, chromic sulfate, ammonium chromate, ammonium dichromate, or other soluble salts of chromium. The highest conversions were obtained from the catalyst that contained only chromium oxides after activation. Impregnation with chromium trioxide ($CrO_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 10 or more weight percent and is ordinarily a minor component of the catalyst in terms of weight percent. Chromium contents as high as 50 weight percent are operative, but amounts above 10 weight percent appear to have little added advantage for the polymerization of ethylene. However, for the polymerization of propylene and higher boiling olefins, chromium contents as high as 25 or 30 percent are often advantageous. A preferred nonchromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is found that steam treatment of certain commercially available forms of silica-alumina or silica without appreciable alumina, improves the activity and life of the catalyst composite in a polymerization reaction. A silica support of lower surface area and larger pore size is a better support than one having extremely higher surface area and small pore size. These factors are believed to be of importance in the removal of the heavy polymer from the surface of the catalyst composite. A chromium oxide-alumina catalyst ordinarily has about two-thirds the activity of a chromium oxide-silica-alumina catalyst. It is necessary for some of the chromium to be in the hexavalent state to act as an active promoter or catalyst for the polymerization reaction of this invention. It is preferred to use catalyst in which the amount of hexavalent chromium is at least 0.1 percent of the weight of the catalyst composite, at least at the initial contacting with the hydrocarbon. The hexavalent chromium is determined by ascertaining the water-soluble chromium present by leaching with water and determining the dissolved chromium in the leachings by any suitable analytical method known in the art, e.g. addition of potassium iodide solution and titration of the liberated iodine with sodium thiosulfate solution.

The preferred steam activation of certain silica-alumina bases, previously mentioned, is conducted at a temperature of approximately 1200° F. for 10 hours utilizing 5 volume percent steam admixed with 95 volume percent air. In the steam activation treatment, the temperature can be varied from 1100 to 1300° F. and the steam content of the steam-air mixture can range from about 3 to about 10 percent. The time of treatment can vary from about 4 to about 15 hours.

Another suitable "base" or "support" for our catalyst is microspherical silica-alumina containing, for example, 10 to 15 weight percent alumina.

The molecular weight of the product can be changed by pretreating the catalyst base, preferably before addition of the chromium oxide, with a fluoride, alone or in aqueous or non-aqueous solution, e.g., aqueous or anhydrous hydrogen fluoride or other organic or inorganic fluoride, especially a volatile fluoride such as ammonium fluoride or ammonium hydrogen fluoride, and heating, e.g., at from 300 to 1100° F. for from 0.5 to 10 hours, to remove residual fluoride. This treatment results in a catalyst which, after addition of the chromium oxide, produces a polymer of increased molecular weight and flexibility. From 0.001 to 0.2 part by weight of the fluoride per part by weight of oxide treated produces the improved results, although these figures do not represent absolute limits.

The terms "support" or "base," as used herein, are not to be narrowly interpreted. They are not limited to mere inert components of the catalyst mass. In fact, the non-chromium components appear to impart to the catalyst at least part of its activity, and variations in their identity and proportions affect the catalyst activity. The "support" is preferably utilized in the porous form, e.g., a gel.

Other methods of preparing the catalyst, e.g., co-precipitation, are within the scope of the invention.

The temperature to be used in carrying out the polymerization reaction can vary over a broad range but normally ranges from about 100 to about 500° F., preferably 150 to 450° F. The preferred range for propylene and higher olefins is 150 to 250° F., and that for ethylene is 275 to 375° F. when a fixed bed of catalyst is utilized. When a mobile catalyst is used, the preferred polymerization temperature range is 175 to 350° F. for ethylene and that for propylene and heavier olefins is about 180 to 200° F. At temperatures lower than those in the preferred ranges, the rate of catalyst deactivation increases and catalyst-bed plugging may occur, and at temperatures higher than those in the preferred ranges, the rate of catalyst deactivation increases and polymer molecular weight decreases. Our polymerization process is a relatively low-temperature process. The maximum temperature of polymerization appears to be that at which reaction, other than polymerization, between the hydrocarbon feed, or some component or components thereof, and the catalyst proceeds at such a rate, relative to that of polymerization, that polymerization is negligible, at least as regards the formation of solid polymer. This temperature is in the vicinity of 500° F. Ordinarily, the process is conducted at temperatures up to only about 450° F., and usually not above 375° F.

The pressure is preferably high enough to maintain any diluent (subsequently discussed) in the liquid phase and to assure that olefins not liquefied under these conditions are dissolved in the liquid phase in sufficient amount. This often, but not invariably, requires a pressure of at least 100 to 300 p.s.i., depending on the feed and the temperature, and a pressure of approximately 500 p.s.i. is to be preferred. The pressure can be as high as 700 p.s.i. or higher, if desired. It can be as low as atmospheric when, for example, the reaction is conducted in the gaseous phase. As a general rule, high pressures favor the production of high molecular weight polymers, all other conditions being constant. The feed rate can range from 0.1 to 20 liquid hourly space velocity with a preferred range of 1 to 6 liquid hourly space velocity in a liquid-phase process with fixed-bed catalyst. Hydrocarbon diluents, preferably paraffins and/or cycloparaffins, serve as solvents for the polymer products to aid in the removal of the product from the catalyst in the reactor or as diluents. The diluents include aliphatic paraffins having from 3 to 12, preferably 5 to 12, carbon atoms per molecule. Any hydrocarbon diluent which is relatively inert, nondeleterious, and liquid under the reaction conditions of the process can be utilized.

Diluents that have been used successfully for the polymerization of ethylene, propylene and other olefins according to this invention include propane, isobutane, normal butane, normal pentane, isopentane, isooctane (2,2,4-trimethylpentane), cyclohexane, and methcyclohexane. Normal hexane, the isohexanes such as neohexane and diisopropyl, normal heptane, the isoheptanes such as 2-methylhexane and triptane, normal octane, normal nonane, the isononanes, cyclopentane, methylcyclopentane, the dimethylcyclopentanes, and the dimethylcyclohexanes can also be used. Methane and/or ethane can be used, especially where gas-phase contacting is practiced, and for liquid-phase contacting they can be used in admixture with the heavier hydrocarbons mentioned. The heavier paraffinic diluents have a higher solvent power for the product polymer than do the lighter ones. However, the ligher paraffins are quite useful in our process. Aromatic hydrocarbon diluents are operative, although less preferred in many cases, since it appears that they require more expensive purification than do nonaromatics.

The polymerization can be effected with a fixed-bed catalyst or with a mobile catalyst. A frequently preferred method of conducting the polymerization reaction comprises contacting the feed olefin with a slurry of the comminuted chromium oxide catalyst in suspension in the solvent or diluent. From about 0.01 to 10 weight percent of catalyst, based on weight of diluent, is ordinarily used. The catalyst can be maintained in suspension by a mechanical agitation device and/or by virtue of the velocity of the incoming feed or diluent. In this type of operation, a large portion of the product polymer remains associated with the catalyst, which is withdrawn from the reaction zone, as a slurry. The polymer can be separated from the catalyst by dissolution in a solvent of the type described, usually with the aid of heat and agitation, and the stripped catalyst can be recycled and/or regenerated. The regeneration can be accomplished by oxidizing the residual carbonaceous deposit with a controlled concentration of oxygen in an inert gas by conventional procedures. However the productivity of our catalyst is sufficiently high that it is often economical to discard the used catalyst after a single pass through the reactor. In some cases, especially where a pigment such as carbon black is to be added to the polymer product, or where high polymer productivity is obtained, the catalyst need not even be separated from the polymer.

Used catalyst can be regenerated in auxiliary equipment in the usual manner. The catalyst is first washed with a hydrocarbon solvent, such as pentane, isooctane, or cyclohexane, at a temperature in the range of 300 to 400° F. under sufficient pressure to maintain the solvent in the liquid phase. Following this, solvent vapor is removed by flushing with inert gas and any remaining solid polymer is removed from the catalyst with dry air diluted with inert gas. The temperature at which the solid polymer is burned off the catalyst is maintained preferably in the range of 900 to 1100° F. Solid polymer is recovered from the solvent used in the washing step and the polymer-free solvent is reusable in subsequent washings.

Further, according to this invention, special benefits can be obtained by utilizing, as feed to the process, a mixture of at least two different olefins. For example, ethylene and propylene can be copolymerized, as can ethylene and 1-butene, 1-butene and propylene, or propylene and a pentene, in the presence of a chromium oxide polymerization catalyst. By using a propylene-ethylene mixture containing from 10 to 45 weight percent propylene as a feed component, a copolymer is obtained which has increased flexibility and is readily capable of being extruded to form a film. Films of this type are unusually resistant to moisture-vapor penetration and are useful as wrappings for foods, drugs, chemicals, and the like. By using, as a feed ingredient, a propylene-ethylene mixture containing from 0.5 to 10 weight percent propylene, spalling or disintegration of the catalyst particles is decreased. This is an advantage in a fixed-bed or gravitating-bed process where filtration is not needed for catalyst removal. A similar effect is obtained by the use of a propylene-ethylene mixture containing from about 1 to about 20 weight percent ethylene. The preferred temperature range for ethylene-propylene copolymerization is from 175 to 320° F., more preferably 200 to 280° F.

Many of the copolymers of this invention have a flexibility rating, as determined by the falling ball method, of at least 72 inches, even when produced in a fixed-bed process. This rating is determined by allowing a 90-gram steel ball to fall from a measured height and strike a molded disc of the copolymer two inches in diameter and one-eighth inch thick. The ball falls along a mechanical guide, and the height from which the ball drops is measured. The minimum height required to shatter the molded disc is taken as a rating of flexibility or susceptibility to shattering. The maximum height measurable according to this method and apparatus is 72 inches. Thus, many of the copolymers of this invention are not shattered by the falling ball within the limits of measurement of the method. In contrast, so-called brittle polymers can be shattered by the ball when it falls from a much smaller height, such as no more than 6 to 10 inches.

In addition, diolefins can be copolymerized with 1-monoolefins of the class herein defined. Thuse ethylene and 1,3-butadiene have been copolymerized, according to this invention, in a 9:1 weight ratio in the presence of a chromium oxide-silica-alumina (2.5% Cr) catalyst at 270° F. to obtain a copolymer having a molecular weight of 33,690.

The polymer and copolymer films prepared according to this invention have a moisture penetration rating not greater than 1 gram per mil thickness per 100 square inches per 24 hours. The method of determination of moisture transmission or penetration is referred to in certain of the subsequent examples. The films are also characterized by having transverse tear strengths of at least 170, and often at least 185, grams per mil of thickness, as determined by a method subsequently described herein.

Films extruded from solid, flexible, high copolymers prepared by the copolymerization of ethylene with propylene over a chromium oxide-silica-alumina catalyst according to this invention have, in addition to very low moisture-vapor permeability, good tensile strength and tear strength. They are superior in moisture-vapor permeability to films prepared from presently available commercial polyethylenes produced by other processes. They are particularly desirable for film packaging materials for meats, cheese, fresh vegetables, dried eggs, milk, etc., and for coating paper to be used as packaging material. Films ranging in thickness from ⅛ inch to 0.001 inch or less can be prepared from the copolymers of this invention.

Films prepared by blending commercial polyethylene with solid ethylene polymers prepared over a chromium oxide-silica-alumina catalyst have low moisture-vapor permeability. Films prepared from ethylene-propylene copolymers, as herein described, have properties as good or better than those prepared from blends of the two types of ethylene polymers and, in addition, there are certain advantages in the process steps for the production of the copolymer films. Ethylene-propylene copolymers are readily prepared and used as such for extrusion into films without further processing.

Many of the ethylene-propylene copolymers of this invention are flexible materials which generally have a melt index less than 25, preferably between 0.01 and 1.0. (Melt index, as determined by ASTM Method D 1238–52T, is the rate of extrusion of a thermoplastic material through an orifice of a specified length and diameter, under prescribed conditions of temperature and pressure.)

The following specific examples present data which illustrate and clarify the invention but should not be so interpreted as to restrict or limit the invention unnecessarily.

SPECIFIC EXAMPLES

*Example I.—Polymerization of olefins over chromium oxide-silica-alumina*

Individual monoolefins and diolefins were polymerized in flow-type runs over a fixed bed of 3 percent chromium as oxide in a chromium oxide-silica-alumina[1] catalyst (prepared by impregnation with $CrO_3$ solution, activation above 700° F. in dry air) at about 600 pounds per square inch at a temperature of about 190° F. and a liquid hourly space velocity of 2, the feed containing 20 mol percent reactant and 80 mol percent isobutane. Most runs were for 4 to 6 hours. The results of the conversions and the qualitative nature of the polymers are given in Table I.

TABLE I

| Monomer | Average Conversion, percent | Type of Polymer, etc. |
| --- | --- | --- |
| Normal 1-olefins: | | |
| Ethylene | 100 | Solid, slightly waxy. Reactor plugged in 2 hrs. |
| Propylene | 91 | Tacky, semi-solid. |
| 1-Butene | 77 | Tacky, elastic semi-solid. |
| 1-Pentene | 82 | Tackier than polypropylene; semi-solid. |
| 1-Hexene | 40–56 | Very tacky, transparent semi-solid. |
| 1-Octene | 58 | Tacky, contained about 4 wt. percent solids including wax (possibly dimer or trimer). |
| 1-Dodecene | 16 | (Run at 260° F.) liquid. |
| Normal 2-olefins: | | |
| 2-Butene | 5 | Liquid (dimer and trimer). |
| 2-Pentene | 5 | Do. |
| 2-Hexene | 11 | Do. |
| 2-Octene | 1 | Wax (probably dimer and trimer.) |
| Branched 1-olefins: | | |
| Isobutylene | 87 | Liquid (dimer and trimer). |
| 2-Methyl-1-butene | 6 | Do. |
| 3-Methyl-1-butene | 15 | Do. |
| 4-Methyl-1-pentene | 80 | Semisolid. |
| 4-Vinylcyclohexene | 6 | Liquid. |
| Branched 2-olefins: 2-methyl-2-butene. | 12 | Do. |
| Cyclic Olefins: Cyclohexene. | <5 | Do. |
| Diolefins: | | |
| Butadiene | 55 | Solid. |
| Isoprene | 34 | Do. |
| Aryl Olefins: Styrene | 0 | |

The results shows that only 1-olefins give the high polymer. Normal 1-olefins give high polymers which vary in degree of solidity and tackiness as noted. Ethylene reacted most vigorously, and it appeared that the reaction rate decreased as the length of the polymer chain increased.

For the branched 1-olefins tested, any branching closer to the double bond than the 4-position prevented formation of heavy polymer. 4-methyl-1-pentene gave semisolid polymer which was successfully expelled from the reactor in continuous-flow operation.

Both 1,3-butadiene and isoprene gave solid polymer.

*Example II.—Effect of temperature on propylene conversion*

Runs were made with chromium oxide-silica-alumina (weight ratio $SiO_2:Al_2O_3=9:1$) catalyst containing 3 percent chromium as chromium oxide (prepared as in Example I), operating at 600 pounds per square inch, a liquid hourly space velocity of 2, and a feed consisting of 11 mol percent propylene, 14 mol percent propane, and 74 mol percent isopentane. The data ob-

---

[1] $SiO_2:Al_2O_3$ ratio, 9:1 by weight.

tained are given in Table II and indicate an optimum temperature range of 150 to 250° F.

TABLE II

|Temp., °F.|Propylene Conversion, Percent| | |
|---|---|---|---|
| |After 2 hrs.|3 hrs.|4 hrs.|
|150|59|82|89|
|190|93|95|94|
|250|86|90|83|
|300|62|33|23|

Example III

Hydrocarbon diluent was varied in runs made at 180 to 190° F., 600 pounds per inch, two liquid hourly space velocity of feed containing propylene, propane and other diluent. The results are given in Table III. An improvement in conversion was obtained as the molecular weight of the feed diluent was increased from propane to isobutane to pentane or isopentane. No further improvement was obtained in short runs with isooctane as diluent. However, in longer runs, isooctane showed improvement over the other diluents, as shown in Table IV.

TABLE III

|Solvent Tested|Feed Composition, Mol Percent| | |Percent $C_3H_6$ Conv., Hrs.| | | |
|---|---|---|---|---|---|---|---|
| |Solvent|$C_3H_6$|$C_3H_8$|2|3|4|5|
|Propane| |25|75|82|82| |86|
|Isobutane|88|12| |90| |92|87|
|n-Pentane|75|12|13| |91|95|96|
|Isopentane|75|12|13|93|95|97|97|
|Isooctane|66|17|17|84|92|96|98|

TABLE IV.—OPERATION AT 220° F., 600 P.S.I.G., 2 LHSV OF FEED
[Containing 9 mol percent $C_3H_6$, 12 mol percent $C_3H_8$, 79 mol percent solvent]

|Solvent|Percent $C_3H_6$ Conversion, Hrs.| | | |
|---|---|---|---|---|
| |5|10|20|40|
|Isopentane|95|92|72|44|
|Isooctane|97|94|82|58|

The catalyst had the same composition as that in Example II and was prepared in the same manner, i.e., impregnation and activation as previously described.

Example IV.—Suspended catalyst

Shaker-autoclave tests were made to study batch operation and to determine the effects of varying the feed-to-catalyst ratio in this type of operation. The catalyst was 14/28 mesh silica-alumina [2] promoted with 3 percent by weight of chromium as chromium oxide and activated at 930° F. (preparation as previously described). The feed stock was a blend of 20 mol percent technical grade propylene and 80 mol percent technical grade isobutane. The catalyst was suspended in the liquid charge in the shaker-autoclave for six hours at a temperature of 190° F. The results of these tests are shown in Table V. For a constant reaction time of 6 hours, the total propylene conversion decreased from 98 percent with a 4:1 feed-to-catalyst weight ratio to 18 percent with a 50:1 ratio. However, calculations showed (see Table V) that the grams of propylene converted per gram of catalyst increased from 0.54 with a 4:1 feed-to-catalyst ratio to 1.41 with a 10:1 ratio, and thereafter remained relatively constant.

[2] $SiO_2:Al_2O_3$, 9:1 by weight.

TABLE V.—PROPYLENE CONVERSION PER GRAM OF CATALYST IN AUTOCLAVE TESTS
[Six-hour tests at 190° F. with 20 mol percent $C_3H_6$, 80 mol percent $iC_4H_{10}$ feed]

|Feed-to-Catalyst Weight Ratio|Percent $C_3H_6$ Converted|Grams $C_3H_6$ Converted Per Gram of Catalyst|
|---|---|---|
|4:1|98|0.54|
|8:1|95|1.15|
|10:1|91|1.41|
|25:1|38|1.35|
|50:1|18|1.33|

Example V.—Chromium oxide content of the catalyst

To determine the effect of chromium oxide content of the catalyst upon activity of the catalyst and nature of the product, catalysts were prepared by impregnating a commercial steam-aged silica-alumina support with aqueous chromium nitrate or trioxide solutions over a wide range of concentrations. The results of propylene polymerization tests with these catalysts are shown in Table VI. The support contained 90 weight percent silica and 10 weight percent alumina. The catalyst was activated by heating for several hours at 900 to 1000° F. in anhydrous air.

TABLE VI.—VARIATION OF CHROMIUM OXIDE CONTENT OF CATALYST

Commercial steam-aged silica-alumina, 14/28 mesh, promoted with various amounts of chromium oxide. Runs made at 180 to 190° F., 600 p.s.i.g., and a 2 LHSV of 12 mol percent propylene, 13 mol percent propane, 75 mol percent isopentane feed.

|Chromium Content of Catalyst, Wt. Percent|Percent $C_3H_6$ Conv., Hrs.| | | |Nature of Polymer|
|---|---|---|---|---|---|
| |2|3|4|5| |
|0.16|73|83|94|88|Sirupy semi-solid.|
|1|66|87|94|97|Semi-solid, tacky.|
|1.5|83|95|98|97|Do.|
|3|93|95|97|97|Do.|
|6| |80| |89|Do.|

From the results shown in Table VI, it appears that the preferable chromium oxide content of the silica-alumina support was in the range of one to three weight percent, expressed as chromium, under the conditions investigated. The catalysts of higher chromium oxide content produced what appeared to be slightly more viscous polymer, but the effect was small considering the range covered.

TABLE VII

Five-hour runs with ethylene were made at 308 to 313° F., 400 p.s.i.g., 4.6 to 5.2 LHSV of about 3 weight percent ethylene, 97 weight percent isooctane (2,2,4-trimethylpentane). Catalyst preparation as in foregoing examples.

|Chromium Content of Catalyst, Wt. Percent|Conversion, Wt. Percent|
|---|---|
|0.17|83|
|0.66|95|
|2.25|100|
|7.66|93|

Example VI

Table VIII presents the results obtained with supports of varying silica-alumina ratio and source, and from supports other than silica-alumina.

Each catalyst was prepared by impregnating the 14/28 mesh support with an 0.8 molar aqueous solution of chromium nitrate, drying, and activating for five hours at 930° F. in dry air. The finished catalyst contained about 2 to 4 weight percent chromium as oxide. The catalysts were then tested in polymerization runs with propylene-propane-isopentane feed as described in Table VIII.

TABLE VIII.—SURVEY OF CATALYST SUPPORTS

Chromium oxide-promoted catalysts were prepared from the supports shown. Polymerization tests at 180° F., 600 p.s.i.g., and 2 LHSV of 12 mol percent propylene, 13 mol percent propane, 75 mol percent isopentane feed.

| Catalyst Support | Percent $C_3H_6$ Conv.[1] | | | |
|---|---|---|---|---|
| | 2 hr. | 3 hr. | 4 hr. | 5 hr. |
| Silica gel | 77 | 85 | 85 | 70 |
| 98% silica, 2% alumina | 69 | 76 | 33 | 35 |
| 90% silica, 10% alumina (extruded pellets) | 93 | 95 | 97 | 97 |
| 90% silica, 10% alumina (beads) | 73 | 90 | 93 | 94 |
| 54% silica, 46% alumina (Filtrol) | 79 | 77 | 67 | 55 |
| 5% silica, 95% alumina | 62 | 72 | 69 | 66 |
| Alumina gel | 45 | 45 | 36 | 30 |
| HF-treated alumina gel | 53 | 39 | 35 | 28 |
| Bauxite | 62 | 57 | 60 | |
| Brucite (magnesium oxide) | 0 | | | |
| Activated carbon | 0 | | | |
| 86% $SiO_2$—10% $ZrO_2$—4% $Al_2O_3$ | | 89 | 95 | 94 |
| Chrome-bead $SiO_2$—$Al_2O_3$ (0.4 wt. percent Cr) | 90 | 86 | 70 | 56 |

[1] High molecular weight tacky and solid polymer was produced in all runs in which propylene was converted.

It is seen from Table VIII that, although conversion of propylene was obtained over the entire range of silica-alumina ratio, the catalysts of highest activity were prepared from coprecipitated 90 silica–10 alumina supports. The 54 silica–46 alumina support was an acid-activated halloysite clay.

The commercial pellets and commercial bead supports were of the same apparent chemical composition (90 percent silica, 10 percent alumina), but the pelleted support, which was prepared by coprecipitation and steam aging, appeared to provide a more satisfactory catalyst. On account of the differences in methods of preparation of these two supports, the commercial pellets have lower surface area and larger pore size than the beads and have a greater number of so-called "macropores" per unit weight or volume. These factors are believed to be of importance in the removal of the heavy polymer from the chromium oxide-silica-alumina catalyst surface.

The "HF-treated alumina" in Table VIII was prepared by precipitating alumina gel from 3640 grams of aluminum nitrate nonahydrate in solution in 28 liters of water by addition of 2 liters of 28 percent aqueous ammonia, mixing the filtered, undried gel with 9.5 ml. of 47 percent aqueous hydrofluoric acid in 200 ml. of water, stirring for 2 hours, drying the mixture at 215° F. for 24 hours, calcining at 750 to 800° F. for 20 hours, forming the solid into pellets by use of a hydrogenated vegetable oil as a binder, and burning out the binder at about 1000° F.

The two supports containing neither silica nor alumina gave no conversion of propylene. A catalyst prepared with commercial silica-zirconia-alumina cracking catalyst as support gave good conversion. The commercial chrome-bead silica-alumina cracking catalyst, already containing 0.5 percent chromium oxide, produced high molecular weight polymer from propylene with no further addition of chromium oxide but the activity declined relatively rapidly.

*Example VII.—Metal oxide components*

A survey of the available metal oxides as possible catalyst components was made and the results of the survey are presented in Table IX. In each case, commercial coprecipitated steam-aged 90 silica–10 alumina was impregnated with an aqueous solution of the compound shown in the table, and the catalyst was dried and then activated at 930° F. in dry air. In most cases, the activated catalyst contained about three to four weight percent of the metal as oxide. The activated catalyst was tested for propylene polymerization under the conditions given in Table IX.

TABLE IX.—SURVEY OF METAL OXIDE PROMOTERS

Commercial 90 silica–10 alumina, 14/28 mesh, promoted with the compounds listed. Polymerization tests at 160° F., 600 p.s.i.g., and 2 LHSV of 25 percent propylene, 75 percent propane feed, 5-hour runs.

| Impregnating solution | Probable Component | Percent $C_3H_6$ Conv. | | Polymer | |
|---|---|---|---|---|---|
| | | 2 Hrs. | 5 Hrs. | State | Sp. Gr. |
| $Cr(NO_3)_3.9H_2O$ | $Cr_2O_3$—$CrO_3$ | 82 | 86 | Semisolid | |
| Ni and Th nitrates | NiO and $ThO_2$ | 80 | 79 | liquid | 0.71 |
| $Fe(NO_3)_3.9H_2O$ | $Fe_2O_3$ | 53 | 60 | do | 0.77 |
| $Mn(NO_3)_2.6H_2O$ | $MnO_2$ | 54 | 1 32(6) | do | 0.76 |
| $UO_2(NO_3)_2.6H_2O$ | $UO_3$ | 52 | 25 | do | 0.76 |
| $VOC_2O_4$ | $V_2O_5$ | 39 | 38(3) | do | 0.77 |
| $(NH_4)_6Mo_7O_{24}.4H_2O$ | $MoO_3$ | 48 | 55(3) | do | 0.74 |
| Reduction of $MoO_3$ | $MoO_2$ | 57 | 44 | do | 0.75 |
| $H_2WO_4 + NH_4OH$ | $WO_3$ | 56 | 63 | do | 0.75 |
| $Cd(NO_3)_2.4H_2O$ | CdO | 10 | | do | |
| $Zn(NO_3)_2.6H_2O$ | ZnO | 0 | | | |
| $Cu(NO_3)_2.3H_2O$ | CuO | 0 | | | |
| $AgNO_3$ | Ag | 0 | | | |
| $ZrO(NO_3)_2.2H_2O$ | $ZrO_2$ | 23 | | liquid | 0.76 |
| $SnCl_4$ | $SnCl_2$ | | 43 | do | 0.76 |
| $Pb(NO_3)_2$ | PbO | 0 | | | |
| $Pd(NO_3)_2$ | PdO | 34 | 21(4) | liquid | 0.76 |
| $Ce(NO_3)_3.6H_2O$ | $CeO_2$ | 10 | | do | |
| $H_2PtCl_6.6H_2O$ | Pt | 13 | | do | |
| $Th(NO_3)_4.4H_2O$ | $ThO_2$ | 8 | 7 | do | |
| $NaNO_3$ | $Na_2O$ | 0 | | | |
| $Ba(NO_3)_2$ | $BaO_2$—BaO | 8 | | liquid | |
| $Mg(NO_3)_2.6H_2O$ | MgO | 8 | | | |
| No Promoter | | 33 | 27 | liquid | 0.75 |

[1] Times other than 5 hr. are shown in parentheses.

It is seen from Table IX that only chromium oxide promoted the formation of high molecular weight polymer. A number of other metal compounds acted as promoters for the formation of liquid polymer, as can be seen by comparing the conversion obtained in each run with that obtained with the unpromoted silica-alumina base, shown at the bottom of the table.

*Example VIII.—Survey of chromium compounds as catalyst components*

Catalysts were prepared from various soluble chromium compounds by impregnation of commercial steam-aged 90 silica–10 alumina with an aqueous solution of the compound, followed by drying and activating at 930°

F. in dry air. Each catalyst was then tested in a propylene polymerization run as described in Table X.

TABLE X

Commercial steam-aged 90 silica–10 alumina, 14/28 mesh, impregnated with 3 to 4 weight percent chromium as compounds listed. Polymerization tests at 160° F., 600 p.s.i.g., and 2 LHSV of 25 mol percent propylene, 75 mol percent propane feed.

| Impregnating Solution | Probable Component | Percent $C_3H_6$ Conv. | | Polymers Description |
|---|---|---|---|---|
| | | 2 Hrs. | 5 Hrs. | |
| $Cr(NO_3)_3.9H_2O$ | $Cr_2O_3$—$CrO_3$ | 82 | 86 | Semisolid, tacky. |
| $CrO_3$ | $Cr_2O_3$—$CrO_3$ | 75 | 84 | Do. |
| $CrCl_3.6H_2O$ | $CrCl_3$—($Cr_2O_3$—$CrO_3$) | 66 | 49 | Do. |
| $Cr_2(SO_4)_3.5H_2O$ | $Cr_2(SO_4)_3$—$Cr_2O_3$—$CrO_3$ | 86 | 50 | Sirupy, tacky. |
| $H_2$ Reduction of $CrO_3$ Cat | $Cr_2O_3$ | .25 | 17 (4 hrs.) | Liquid. |

As shown in Table X, all of the catalysts prepared from the various chromium compounds produced high molecular weight polymer, but the highest conversions were obtained from the catalysts that contained only chromium oxides after activation, i.e., those prepared from chromium nitrate and chromium trioxide. Whether the catalysts prepared from the chloride and sulfate produced high polymer only as a result of partial conversion of chloride or sulfate to oxides during activation is not known but seems likely.

Treatment of chromium oxide catalyst with hydrogen for four hours at 920° F. to reduce hexavalent chromium to the trivalent state gave a catalyst which was almost completely inactive for formation of high polymer. This indicates that hexavalent chromium is essential. Analyses have indicated that a major portion of the chromium oxide present on the catalysts activated at 930° F. in air was hexavalent. (Note Tables XI and XII.)

*Example IX.—Variation of catalyst activation temperature*

The effects of catalyst activation temperature on catalyst activity and character of polymer were determined over a temperature range of 750 to 1500° F. The catalysts were tested in six-hour propylene polymerization runs at the conditions described in Table XI.

TABLE XI

Catalyst, 14 to 28 mesh commercial steam-aged 90 silica–10 alumina impregnated with chromium oxide, tested in six-hour polymerization runs at 190° F., 600 p.s.i., and 2 LHSV of 12 mol percent propylene, 13 percent propane and 75 percent isopentane feed.

| Catalyst Activation | | Catalyst Analysis | | | Polymerization Test—Average $C_3H_6$ Conversion, Percent | Polymer Analysis [1]—MIBK Insoluble at 200° F., Wt. Percent |
|---|---|---|---|---|---|---|
| Temp., °F. | Time, Hrs. | Total Cr, Wt. Percent | $Cr^{+6}$ Wt. Percent | $Cr^{+6}$ Total Cr | | |
| 750 | 10 | 2.1 | 2.2 | 1.0 | 90 | |
| 930 | 6 | 2.8 | 2.5 | 0.9 | 97 | |
| 1,020 | 5 | 3.1 | 2.4 | 0.8 | 97 | 4.6 |
| 1,100 | 5 | 2.1 | 1.9 | 0.9 | 98 | 4.4 |
| 1,300 | 5 | 2.2 | 1.6 | 0.7 | 98 | 2.4 |
| 1,500 | 5 | 1.6 | 0.8 | 0.5 | 99 | 0.5 |

[1] Does not include heavy material which remained on the unflushed catalyst.

The data in columns 3, 4, and 5 present the weight percent of chromium on the catalyst, the amount of hexavalent chromium, and the fraction of the chromium that is hexavalent. The amount of hexavalent chromium was determined on the basis of water-soluble chromium. The heavy ends were determined by filtering and weighing the portion of polymers which were insoluble in methylisobutylketone (MIBK) at 200° F. and a solvent to polymer ratio of 40 ml. to one gram. The analyses reported in Tables XI and XII were on polymer samples collected in the solvent-removal flash chamber during the run.

As shown in Table XI, the activity of the catalyst increased as the catalyst activation temperature was increased over the range of 750 to 1500° F. The amount of heavy ends in the polymer, as indicated by the amount of MIBK insoluble at 200° F., was affected by the activation temperature, and apparently the molecular weight of the polymer decreased at the higher activation temperatures.

The ratio of hexavalent chromium to total chromium on the catalyst decreased as the activation temperature was increased.

Several catalysts were prepared by impregnation of commercial microspheroidal (99 wt. percent finer than 100 mesh) silica-alumina (about 13.3 wt. percent alumina, remainder essentially silica) with an aqueous solution of chromium trioxide. The catalysts were fluidized in dry air during activation. Polymerization tests were carried out in a batch-type stirred reactor at 450 p.s.i.g. and 270° F. using cyclohexane as solvent. Approximately 300 grams of solvent and from 0.45 to 1.0 gram of catalyst were charged to the reactor. After heating the reactor contents to reaction temperature, the reactor was pressured with ethylene to within 50 p.s.i. of operating pressure within the first five minutes, and, after the operating pressure of 450 p.s.i.g. was attained, ethylene was fed at the rate required to maintain that pressure. The duration of each run was three hours. The results, which are presented in Table XI-A, show that, as a practical matter, the minimum activation temperature for the catalyst tested lies between 400 and 450° F. when the polymerization is carried out under the conditions of these runs. If the data for the activations at 450, 555, 650, 700, and 750° F. are plotted on rectangular nonlogarithmic coordinates and if more weight is arbitrarily assigned to the point at 650° F. than to that at 555° F., the minimum activation temperature appears to lie between 430° and 440° F. The minimum activation temperature would be lower if relatively long activation times were used. From a practical point of view, the minimum activation temperature can be considered to be about 450° F. This minimum activation temperature applies only to catalysts prepared by a wet method such as impregnation. This point is subsequently discussed in more detail.

TABLE XI-A.—ACTIVATION TEMPERATURE FOR CATALYST PREPARED BY IMPREGNATION

| Catalyst Activation | | | | Catalyst Testing | |
|---|---|---|---|---|---|
| Temperature, °F. | Time, Hours | Percent Total Cr | Percent $Cr^{+6}$ | Productivity, #/# | Reaction Rate, #/#/Hr. |
| 950 | 5 | 2.38 | 1.68 | 535 | 178 |
| 825 | 5 | 2.30 | 1.46 | 607 | 202 |
| 750 | 5 | 2.22 | 1.18 | 277 | 92 |
| 700 | 5 | 2.36 | 1.24 | 185 | 62 |
| 650 | 5 | 2.14 | 0.97 | 113 | 35 |
| 555 | 20 | 2.99 | 1.73 | 99 | 33 |
| 450 | 20 | 3.13 | 1.96 | 6.6 | 2.2 |
| 400 | 20 | 3.13 | 2.30 | 0 | 0 |

Several runs were carried out to determine the activation conditions for catalysts prepared by dry mixing of chromium trioxide with the previously mentioned microspheroidal silica-alumina. The silica-alumina was calcined in air for five hours at 1175° F. The calcination was carried out with the material in the fluidized state. After cooling to room temperature, 195 grams of the silica-alumina was mixed with 10 grams of dry chromium trioxide in a dry nitrogen atmosphere by shaking in a flask. Portions of this mixture were further treated as described in Table XI-B, and the resulting catalysts were tested for polymerization activity in a batch-type, stirred reactor at 450 p.s.i.g. and 270° F. About 300 grams of cyclohexane and 10 grams of catalyst were charged to the reactor, and, after heating the reactor contents to reaction temperature, the reactor was pressured to reaction pressure with ethylene within five minutes. The run duration was two hours. The results, which are presented in Table XI-B, indicate that optimum activity is obtained by heating. The loss-on-ignition data indicate that moisture was not excessive in any catalyst tested and, consequently, that it was not limiting.

Upon examination of the data of Tables XI-A and XI-B, it will be noted that the impregnated catalyst activation series appears to show that the catalyst should be treated at a temperature of at least around 450° F. to have commercially desirable activity, while in the mixing series a catalyst having appreciable activity was prepared by heating at 350° F. The reason for this difference is believed to reside in the difference in the catalyst preparation methods. When a wet method of preparation, such as impregnation by aqueous solution, is used, the water content of the catalyst must be reduced to a certain level for the catalyst to possess its greatest activity. Apparently this level of moisture content is not reached in a reasonable time at temperatures much below 450° F. On the other hand, when a dry method of preparation is used, for example, mixing of solid $CrO_3$ with calcined silica-alumina, the moisture content need not be limiting, and the minimum temperature appears to be that at which the $CrO_3$ has sufficient mobility to become distributed on the surface of the silica-alumina. For microspheroidal silica-alumina, this minimum temperature appears to be a little below 350° F., although 350° F. could be considered as a minimum from a practical point of view.

TABLE XI-B.—ACTIVATION TEMPERATURE FOR CATALYST PREPARATION BY DRY MIXING

| Catalyst Preparation | | | | Catalyst Testing |
| --- | --- | --- | --- | --- |
| Method of Mixing $CrO_3$ with Silica-alumina | Percent Total Cr | Percent $Cr^{+6}$ | Percent Loss on Ignition [1] | Yield, #/# Catalyst |
| Fluidization [2] at 80° F. for two hours | 2.5–3.0 | | 2.73 | <0.1 |
| Fluidization at 400° F. for two hours | 2.5–3.0 | | 1.56 | 3.6 |
| Ball-milled in Dry $N_2$ at 80° F. for 15 hours | 2.5–3.0 | 2.64 | 2.83 | 0.4 |
| Ball-milled 15 hours, followed by fluidization at 400° F. for two hours | 2.5–3.0 | | 2.74 | 13.8 |
| Ball-milled 15 hours,[3] followed by fluidization at 950° F. for five hours | 2.96 | 1.49 | 1.91 | 376 |
| Calcined Silica-alumina with no $CrO_3$ | | | 1.28 | <0.1 |
| Ball-milled 15 hours, followed by fluidization at 350° F. for two hours | 2.96 | | | 4.2 |

[1] Heated at 1760° F. in air for 16 hours. Figures not corrected for $Cr^{+6}$ loss.
[2] All fluidization was done with dry air.
[3] 0.5 gram catalyst used in the polymerization test.

*Example X.—Effect of aging of catalyst with dry air and with wet air*

To study the effects of prolonged treatment of the catalyst with dry air (dew point below 0° F.) and with wet air at elevated temperatures, such as would be encountered in repeated regenerations, the catalysts were aged 88 hours at 1100° F. and 1300° F. with dry air and at 1100° F. with air saturated with water vapor at 100° F. At the end of the aging period with the wet air, which contained about 6.5 percent water vapor, the catalyst was swept with dry air for five hours at 1100° F. Results of the polymerization test on these catalysts and similar data on unaged catalysts are shown in Table XII.

TABLE XII

Catalyst, 14/28 mesh commercial steam-aged 90 silica–10 alumina impregnated with chromium oxide, tested in six-hour polymerization runs at 190° F., 600 p.s.i.g., and 2 LHSV of 12 mol percent propylene, 13 percent propane and 75 percent isopentane feed.

| Catalyst Treatment | | | Catalyst Analysis | | | Polymerization Test—Average $C_3H_6$ Conv., Percent | Polymer Analysis [1]—MIBK Insoluble at 200° F., Wt. Percent |
| --- | --- | --- | --- | --- | --- | --- | --- |
| Temp., ° F. | Gas | Time, Hrs. | Total Cr, Wt. Percent | $Cr^{+6}$, Wt. Percent | $Cr^{+6}$, Total Cr | | |
| 1,100 | Dry air | 5 | 2.1 | 1.9 | 0.9 | 98 | 4.4 |
| 1,100 | do | 88 | 2.1 | 1.9 | 0.9 | 99 | 2.2 |
| 1,100 | Wet air [2] | 88 | 2.5 | <0.1 | <0.1 | 55 | 5.1 |
| 1,300 | Dry air | 5 | 2.2 | 1.6 | 0.7 | 98 | 2.4 |
| 1,300 | do | 88 | 2.0 | 1.1 | 0.5 | 98 | 2.5 |

[1] Does not include heavy material which remained on the unflushed catalyst.
[2] Wet air contained about 6.5 percent water vapor. Catalyst was flushed with dry air for five hours at 1100° F. after the wet air treatment.

As shown in Table XII, treatment with dry air for 88 hours at 1100° F. resulted in a catalyst which had slightly higher activity and produced a lighter weight polymer than did the catalyst activated at 1100° F. for 5 hours. Similar variation in the time of treatment at 1300° F. did not affect the catalyst activity or polymer distribution. The ratio of hexavalent to total chromium on the catalyst was not affected at 1100° F., but decreased slightly at 1300° F. by the prolonged treatment.

Treatment with air containing about 6.5 weight percent water vapor for 88 hours at 1100° F. decreased the activity of the catalyst considerably and, as compared with the run at 1100° F. for 88 hours, doubled the fraction of polymer insoluble in MIBK at 200° F. This catalyst, which contained less than 0.1 percent hexavalent chromium, was a bright-green color as compared to a gray-green for that treated with dry air at 1100° F.

All of the data presented in the previous examples were obtained using 14 to 28 mesh catalyst particles, except as otherwise described. The data presented in the succeeding examples were obtained by contacting the feed with 5/32 x 5/32 inch pellets of coprecipitated 90 silica–10 alumina impregnated with chromium oxide (aqueous CrO₃), except where specifically indicated otherwise.

*Example XI.—Catalyst supports: variation of silica-alumina ratio*

Catalyst supports of 90–10, 50–50, and 10–90 silica-alumina compositions were prepared by pilling a mixture of silicic acid and precipitated alumina and calcining at 1000° F. The catalyst bases were impregnated with 0.8-molar chromium trioxide solution and activated at 1300° F. in dry air. Results and operating conditions of the polymerization tests on these catalysts along with data on catalysts prepared using commercial steam-aged 90 silica–10 alumina base are shown in Table XIII.

TABLE XIII

Chromium oxide-promoted catalyst, 5/32-inch pellets, were prepared from the support shown. Polymerization tests at 220° F., 600 p.s.i.g. and 2 LHSV of 7 mol percent propylene, 9 percent propane and 84 percent isopentane feed.

| Catalyst Support | | Polymerization Test—Percent Propylene Conv., Hrs. | | | | Physical Condition of Used Catalyst |
|---|---|---|---|---|---|---|
| Percent Silica | Percent Alumina | 2 | 5 | 10 | 15 | |
| 10 | 90 | 62 | 39 | 29 | 26 | Good. |
| 50 | 50 | 80 | 72 | 42 | 23 | Good. |
| 90 | 10 | 88 | 91 | 65 | 17 | Spalled. |
| 90 | ¹10 | 94 | 95 | 92 | 84 | Good. |

¹ Commercial, steam-aged.

As shown in Table XIII, increasing the silica content of the base from 10 to 90 percent increased the initial catalyst activity. After the 15-hour tests, the catalyst prepared from 90 silica–10 alumina support showed signs of spalling, i.e., crumbling or shelling off of the outer layer of the pellets, whereas the catalyst of higher alumina content remained in good physical condition. The steam-aged 90 silica–10 alumina support resisted physical disintegration in contrast to the untreated support having the same composition.

*Example XII.—Effects of variation of operating temperature*

Further studies were made on the effects of operating temperature, and longer tests and more accurate evaluations of the polymer were obtained. Results and operating conditions of these tests are shown in Table XIV. The polymer analyses were on samples which included the polymer flushed from the reactor at the end of the runs. Comparisons of polymers were based on the quantity of light and heavy ends. The light ends were determined by vacuum distillation and are reported as weight percent polymer boiling below 850° F. at one atmosphere pressure. The heavy ends were determined by filtering and weighing the portion of polymers which were insoluble in methylisobutylketone (MIBK) at 200° F. and a solvent to polymer ratio of 40 ml. of one gram.

TABLE XIV

Operation at 600 p.s.i.g. and 2 LHSV of 7 mol percent propylene, 9 percent propane and 84 percent isopentane feed over chromium oxide-90 silica–10 alumina pelleted catalyst activated at 1300° F. in dry air.

| | Polymerization Tests | | | | | Polymer Analysis | | Physical Condition of Used Catalyst |
|---|---|---|---|---|---|---|---|---|
| Operating Temp., ° F. | Percent Propylene Conv., Hrs. | | | | | Wt. Percent 850° F. | MIBK insoluble at 200° F., Wt. Percent | |
| | 5 | 10 | 20 | 30 | 40 | | | |
| 190 | 94 | 88 | 45 | 20 | 8 | 10 | 10.2 | Spalled. |
| 220 | 95 | 92 | 72 | 52 | 44 | 16 | 7.3 | Good. |
| 245 | 91 | 79 | 28 | | | 27 | 5.1 | Good (20 hrs.). |

The maximum conversion and longest cycle length at high conversion were obtained at 220° F. The molecular weight of the polymer decreased, as shown by the increase in "850° F." polymer and decrease in MIBK insoluble polymer, as the temperature was increased from 190 to 245° F. About 25 percent of the catalyst used in the run at 190° F. was spalled or crumbled. Most of this catalyst disintegration occurred in the top (inlet) portion of the catalyst bed. The catalysts used in the runs at the higher temperatures remained in good physical condition.

Although higher conversion was obtained and less physical damage to the catalyst occurred at 220° F., polymer containing greater amounts of tacky and solid materials was produced at 190° F. operating temperature.

*Example XIII.—Effects of variation of propylene concentration*

The effects of propylene concentration in the feed upon conversion, polymer composition, and catalyst spalling were studied with feeds containing 4, 7, and 12.5 percent propylene. Results of these runs are shown in Table XV.

TABLE XV

Operation at 220° F., 600 p.s.i.g., and 2 LHSV of feed containing propylene, propane and isopentane over pelleted steam-aged 90 silica–10 alumina-chromium oxide catalyst activated at 1300° F. in dry air.

| Feed Mol Percent Propylene | Polymerization Tests—Percent Propylene Conv., Hrs. | | | | | Polymer Analysis | | Physical Condition Of Used Catalyst |
|---|---|---|---|---|---|---|---|---|
| | 5 | 10 | 20 | 30 | 40 | Wt. Percent 850° F. | MIBK Insoluble @ 200° F. | |
| 4 | 95 | 88 | 54 | 28 | 16 | 19 | 5.8 | Good. |
| 7 | 95 | 92 | 72 | 52 | 44 | 16 | 7.3 | Good. |
| 12.5 | 94 | 86 | 59 | 40 | 24 | 14 | 6.2 | Spalled. |

Optimum conversion was obtained with the feed containing 7 mol percent propylene. The feed with higher propylene concentrations produced slightly heavier polymer. Catalyst spalling occurred when 12.5 percent propylene feed was used.

The polymer production for the 40-hour run using 12.5 percent propylene feed was 3.6 pounds of polymer per pound of catalyst as compared to 2.2 for the 7 percent propylene feed.

The polymer produced from alpha-olefins over a chromium oxide-containing catalyst has a wide molecular weight range. The total polymer can be separated into three fractions, a liquid fraction, a tacky fraction, and a solid fraction containing material at the upper end of the molecular weight range. The separation may be carried out by a number of different methods, and the relative amount and the characteristics of the various fractions will depend somewhat on the method of fractionation used. Two methods of separation are currently used: (1) The total polymer is fractionated under vacuum to produce an overhead fraction having an end point, correlated to atmospheric pressure, of 850 to 900° F. The kettle material is then extracted with MIBK at a temperature somewhat above room temperature yielding as extract the tacky polymer and as raffinate the solid polymer. (2) The total polymer is subjected to extraction with pentane at room temperature, the solid fraction being insoluble. The pentane-soluble material is then extracted, usually twice, with MIBK at room temperature yielding an extract of normally liquid oil and a raffinate of tacky polymer. Method (1) produces considerably less oil and more tacky polymer than method (2). The oil produced by method (2) probably contains in solution some of the lower molecular weight tacky polymer. However, in the case of ethylene polymerization, only very small amounts of nonsolid polymer are produced.

The weight average molecular weight of this tacky propylene polymer lies in the range of 500 to 5,000. The solid polymer fraction is insoluble in pentane at room temperature. The solid material has a melting point in the range of 240 to 300° F., a density in the range of 0.90 to 0.95, an intrinsic viscosity in the range of 0.2 to 1.0, and a weight average molecular weight in the range of approximately 5,000 to 20,000.

The polyethylene of the invention is principally a solid polymer having a freezing point in the range of 240 to 260° F., a density in the range of 0.92 to 0.99, ordinarily 0.95 to 0.97, an intrinsic viscosity in the range of 0.2 to 10, and a weight average molecular weight in the approximate range of 5,000 to 250,000. The melting point is determined from a cooling curve of temperature vs. time; actually, this is a freezing point, though generally termed melting point in the art.

The molecular weights mentioned herein are weight average molecular weights and were calculated according to the equation $$M = \frac{4.03 \times 10^3 \times N_i \times 14}{2.303} = 24,500 N_i$$

wherein M is the weight average molecular weight and $N_i$ is the inherent viscosity as determined for a solution of 0.2 gram of the polymer in 50 cc. of tetralin at 130° C. This type of molecular weight determination is described by Kemp and Peters, Ind. Eng. Chem. 35, 1108 (1943), and by Dienes and Klem, J. Applied Phys., 17, 458 (June 1946).

In addition to the properties discussed hereinbefore, our polyethylenes prepared by the use of a slurried catalyst, as described herein, have a tensile strength of the order of 4000 p.s.i. and higher, an elongation at break of from 10 to 40 percent (crosshead speed, 20 inches per minute), an impact strength from about 1.5 to about 3, a Shore hardness of from about 65 to about 70, a stiffness of at least about 140,000 p.s.i., a brittleness temperature below about −150° F. and usually below about −180° F. and a softening temperature of at least 250° F. and usually 260° F. or higher. They have a low permeability to gases and vapors and can be rolled, drawn, or blown to form film which is useful for the preservation of foods and other perishable goods. They can also be coated on wire as insulation.

We have further found that highly crystalline (above 80 percent crystallinity) normally solid polymers can be obtained by extracting polymers produced according to this invention, including the fixed-bed and mobile-catalyst embodiments thereof, with common organic solvents such as isopentane, normal pentane, chloroform, benzene, methyl isobutyl ketone, cyclohexane, normal heptane and similar, relatively low-boiling solvents at temperatures from about 50° F. up to the normal boiling point of the solvent and recovering the undissolved portion. The crystalline fraction of such a polymer is insoluble whereas the amorphous fraction is soluble in the solvent under such conditions. Crystalline polymers of propylene, of 1-butene, of 1-pentene, and of 4-methyl-1-pentene can thus be obtained. Those of propylenes are characterized by selective absorption of infra-red radiation at certain wave lengths of about 7.7, 7.9 to 8.0, 8.5 to 8.6, 9.1, 9.6, 10.0 to 10.1, 10.3, 10.6 to 10.7, 11.1, and 11.9 microns. These polymers, and crystalline polymers of propylene and higher-boiling olefins in general are described in more detail in our copending application Serial No. 558,530, filed January 11, 1956. These polymers are also characterized by the constant recurrence, in their molecules, of definite and certain atomic groupings in which the substituent groups (e.g. methyl and other side groups or chains) are oriented according to a definite pattern.

Example XIV

A series of runs was conducted in which mixtures of ethylene and propylene were copolymerized in the presence of a catalyst comprising from 4.5 to 5 weight percent chromium oxide deposited on a coprecipitated gel carrier consisting of 90 weight percent silica and 10 weight percent alumina. The catalyst was prepared by impregnating the carrier with an aqueous solution of chromic acid, drying, igniting to form chromium oxide, and heating in anhydrous air for about 6 hours at about 950° F.

All of the runs were conducted at 270° F., 450 p.s.i., and a liquid hourly space velocity of 4.5. The feed to the reactor, which contained a fixed bed of the catalyst, consisted of 99 weight percent 2,2,4-trimethyl-pentane and 1 weight percent of the olefin mixture. The following results were obtained for that fraction of the total copolymer which was insoluble in 2,2,4-trimethylpentane at room temperature:

The films in this example were prepared by utilizing an extrusion apparatus manufactured by the Modern

TABLE XVI.—ETHYLENE-PROPYLENE COPOLYMERIZATION

| Run Number | 10 | 13 | 1 | 4 | 6 |
|---|---|---|---|---|---|
| Weight ratio, $C_2H_4/C_3H_6$ | 90/10 | 85/15 | 80/20 | 75/25 | 60/40 |
| Percent Total olefin conversion | 98 | 94 | 93 | 93 | 84 |
| Weight Percent converted olefin to: | | | | | |
|   Solid polymer | 74 | 64 | 68 | 59 | 42 |
|   i-$C_8$ soluble polymer | 8 | 22 | 22 | 30 | 50 |
|   Catalyst deposits | 18 | 14 | 10 | 11 | 8 |
| Solid Polymer: Impact strength (Izod), ft.lbs. | 0.660 | 0.843 | 0.957 | 1.216 | 1.89 |
| Tensile strength of injection Molded sample, lb/sq. in. | 2,587 | 2,415 | 2,171 | 1,910 | 1,957 |
| Shore "D" Hardness | 55 | 56 | 50 | 51 | 55 |
| Molecular weight | 25,550 | 25,210 | 24,500 | 25,300 | 26,300 |
| Rating (flexibility) | brittle | can be bent but cracks when bent 180°. | can be bent 180° several times. | same as 1 | can be bent 180° many times without breaking or cracking. |

The foregoing data show that, when the propylene content of the olefin feed was less than about 15 weight percent under the stated conditions, the resulting copolymer was brittle, and that when 40 percent propylene was present in the olefin feed, a polymer having much greater flexibility was obtained. It is evident that the conversion efficiency decreases with increasing propylene content. When the propylene content of the feed is above 45 percent, based on total olefin in the feed, the efficiency is still lower than the values shown in Table XXVI and the product more nearly resembles polypropylene.

Example XV

A mixture containing ethylene and propylene in an 80:20 weight ratio dissolved in 2,2,4-trimethylpentane (1 percent solution) was copolymerized at a temperature of 270° F. over a chromium oxide-silica-alumina catalyst (prepared as in Example XIV) containing 5 weight percent chromium as chromium oxide, the feed containing one percent by weight olefins in the isooctane. The ethylene-propylene copolymer obtained had a melting point of 236° F., a density of 0.930, inherent viscosity of 0.987, and a melt index of approximately 12. A film was prepared from this polymer by extruding it on a Modern Plastics 1½ inch extruder. For comparative purposes, a film was prepared from a commercial polyethylene (melting point up to 228° F., density 0.914 to 0.918), and two films were prepared from blends of the commercial polyethylene with a solid polymer of ethylene alone obtained by polymerization of ethylene over a chromium oxide-silica-alumina catalyst and having a melting point of 244° F., a density of 0.961, and an inherent viscosity of 0.585. Tensile strength, elongation, tear strength, and moisture-vapor transmission were obtained on each of the four films. Results were as follows:

Plastics Machinery Corporation, 15 Union Street, Lodi, New Jersey. The machine effects film formation on the principle of feeding a ground polymer at a temperature above its softening point through an annular die and injecting air into the extruded annular film to form an inflated film. The inflated film can be recovered without further treatment or can be passed between a pair of rollers. It is, however, within the scope of the invention to utilize other known means for producing films.

Example XVI

Five runs were made in which ethylene was polymerized over chromium oxide-silica-alumina catalyst prepared as in Example XIV, containing 4.5 to 5.0 weight percent chromium oxide. Operating conditions were 250° F., 450 p.s.i., 4.5 LHSV, 2 weight percent total olefin in feed, and 10-hour operation utilizing a suspended catalyst (stirred) in a continuous flow reactor. The concentration of propylene in the olefin feed was varied from zero to 20 weight percent. The data are shown in tabular form below. The percentage of fines is that weight percent of the total catalyst, after the runs, which was finer than the original catalyst.

TABLE XVIII

| Wt. Percent Propylene in Olefin Feed | Conv., Percent | M.P. | d | M.W. | Falling Ball, in. | Cat. Spalling, Percent Fines |
|---|---|---|---|---|---|---|
| 0 | 82 | 249 | 0.960 | 29,500 | 24 | 4.6 |
| 5 | 85 | 243 | 0.948 | 27,900 | 36 | 0.7 |
| 10 | 84 | 239 | 0.938 | 25,200 | 72 | 0.2 |
| 15 | 79 | 237 | 0.937 | 30,900 | 72 | 0.5 |
| 20 | 79 | 236 | 0.932 | 26,000 | 72 | 1.4 |

From the above data, it is evident that, under the conditions of these runs, when the propylene concentration

TABLE XVII

| Type of Film | Tensile Strength, p.s.i. | | Elongation, Percent | | Tear Strength [2] | | Moisture-Vapor Transmission [3]—G./mil/ 100 sq. in./ 24 hours |
|---|---|---|---|---|---|---|---|
| | T.D.[1] | M.D.[1] | T.D. | M.D. | T.D. | M.D. | |
| Ethylene/propylene copolymer | 1,245 | 1,050 | 20 | 6.2 | 197 | 169 | 0.53 |
| Commercial polyethylene | 2,060 | 1,956 | 528 | 464 | 163 | 166 | 1.11 |
| 20/80 blend ethylene polymer/commercial polyethylene | 1,387 | 1,568 | 265 | 152 | 195 | 160 | 0.67 |
| 30/70 blend ethylene polymer/commercial polyethylene | 1,688 | 1,497 | 214 | 70 | 186 | 135 | 0.59 |

[1] T.D. represents transverse direction; M.D. represents direction of extrusion or "machine direction".
[2] ASTM D 1004–49T. Calculation in grams/mil thickness.
[3] ASTM D 697–42T (Method B). A modification of this method was used with a Payne permeability cup being employed instead of a standard cup. In the Payne permeability cup, the area exposed is 10 sq. cm. as compared to 30 sq. cm. for the standard cup. Runs were made at 100° F. instead of at room temperature.

The foregoing data show that the process of this invention produces a film which is superior to commercial polyethylene as regards moisture-vapor transmission and tear strength.

in the feed was 10 percent or higher, the polymer properties differed markedly from those of the homopolymer, and the differences increased with increasing concentration. Furthermore, it is evident that the addition of the first 5 to 10 percent of propylene to the olefin feed markedly reduced catalyst spalling, as measured by the amount of fines, and increased the conversion; further addition of propylene resulted in little, if any, further decrease in catalyst spalling.

*Example XVII*

Several runs were made in which small amounts of ethylene were added to a propylene feed to a polymerization step according to this invention. Comparative runs were made in which no ethylene was added to the propylene feed. The feed had the following composition in weight percent:

Total olefins _____ 4.5
Propane _____ 5
2,2,4-trimethylpentane _____ 91

The feed was contacted with a fixed bed of catalyst containing 2.5 weight percent chromium as chromium oxide. The catalyst was prepared as in the preceding examples and activated in anhydrous air at 950° F.

The polymerization was conducted at a pressure of 600 p.s.i. and a liquid hourly space velocity of 2. The duration of each run was 12 hours. The following data were obtained:

TABLE XIX

| Propylene-Ethylene Wt. Ratio | Polymerization, Temp., °F. | Conversion, Percent | Polymer Composition, Wt. Percent | | | Spalling of Catalyst |
|---|---|---|---|---|---|---|
| | | | 850° F., E.P. | Tacky | Solid | |
| 10:1 | 190 | 89 | 6.5 | 58.9 | 34.6 | Very slight. |
| 10:1 | 220 | 89 | 13.0 | 61.8 | 25.2 | None. |
| 10:1 | 250 | 84 | 18.0 | 62.3 | 19.7 | None. |
| No ethylene. | 190 | 81 | 12.0 | | | Appriciable. |
| Do | 220 | 90 | 15.0 | 64.0 | 21.0 | Slight. |
| Do | 250 | 64 | 17.0 | 64.0 | 19.0 | None. |
| 1:1 | 220 | 90 | 4 | 49 | 47 | Severe. |

The data show that spalling is more marked at the lower polymerization temperatures and that the spalling is reduced by the presence of small amounts of ethylene, which also tend to increase the olefin conversion per pass.

*Example XVIII*

This example illustrates the production, according to this invention, of flexible polyethylene in a continuous flow system.

The catalyst had a maximum particle size of about 20 mesh. It was prepared by the use of a crushed, commercial silica-alumina cracking catalyst which contained 90 percent silica and 10 percent alumina in the form of a coprecipitated gel. The crushed, coprecipitated gel was immersed in an aqueous solution of chromium trioxide, and the resulting solid composite was separated from the liquid and drained. It was then dried by heating at 500° F. in a stream of air having 0° F. dew point and was finally activated by heating in a stream of air (0° F. dew point) at 925 to 960° F. for 5 hours. The resulting catalyst contained 2.34 weight percent total chromium as chromium oxide. The hexavalent chromium content was 2.00 weight percent.

The catalyst was suspended in a stream of 2,2,4-trimethylpentane as the diluent and passed into a reactor provided with a stirrer. Ethylene was passed into the reactor at the same time. An effluent was withdrawn from the reactor and contained suspended catalyst, solvent and polymer, as well as small amounts of unreacted ethylene. Additional diluent (2,2,4-trimethylpentane) was added to the effluent, and the resulting mixture was passed to a tank having a vent valve through which unreacted gas was vented. The remaining material was heated to dissolve the polymer and the resulting mixture was passed through a filter to remove the catalyst. The polymer was recovered from the resulting liquid by vaporization of the diluent. Table XX shows the reaction conditions in two separate runs.

TABLE XX

| Run Number | I | II |
|---|---|---|
| Feed Rates: | | |
| Ethylene, std. cu. ft./hr | 80 | 85 |
| Isooctane, lb./hr | 26 | 23 |
| Catalyst, lb./hr | 0.22 | 0.22 |
| Diluent addition to effluent, lb./hr | 24 | 29 |
| Vent gas removal rate, cu. ft./hr | 30 | 25 |
| Reaction temperature, °F | 260 | 260 |
| Reaction pressure, p.s.i | 420 | 420 |
| Polymer in effluent, wt. percent | 3.6 | 5.4 |

Table XXI shows the properties of the product polyethylene.

TABLE XXI

| Run Number | I | II |
|---|---|---|
| Volatile matter, wt. percent | 0.04 | 0.14 |
| Melting point, °F | 247 | 248 |
| Density | 0.962 | 0.966 |
| Softening point, °F | 262 | 261 |
| Molecular weight | 44,000 | 47,000 |
| Melt index | 0.640 | 0.356 |
| Tensile, p.s.i.: | | |
| Injection-molded sample | 4,870 | 5,308 |
| Compression-molded sample | 3,260 | 4,196 |
| Elongation, percent: | | |
| Injection-molded sample | 22 | 19 |
| Compression-molded sample | 12 | 19 |
| Hardness, Shore "D" | 68–70 | 68–70 |
| Flex. Temp., °F | +76 | +72 |
| Impact, IZOD | 2.46 | 2.31 |
| Heat distortion, °F | 163 | 165 |
| Tensile, p.s.i.: M.D. (Blown film, about 2 mils thick) | 3,108 | |
| T.D. | 530 | |
| Elongation, percent: M.D. | 25 | |
| T.D. | 1 | |
| Tear, gm./mil.: M.D. | 597 | |
| T.D. | 91 | |
| MVT-gm./100 sq. in./24 hr. | 0.45 | |

The volatile matter reported in the foregoing tabulation was determined by heating a sample of the product polyethylene at from 70 to 80° F. in a vacuum oven to constant weight and determining the weight loss. This ordinarily requires a heating period of from 10 to 15 hours.

The melting point was determined by melting a sample of the polymer and allowing it to cool slowly, the temperature being plotted against time, to obtain a cooling curve. The temperature corresponding to a plateau in the cooling curve was taken as the melting point.

The density was determined at 23±1° C. by immersion in a solvent having a density equal to that of the polymer, a Westphal balance being utilized.

The softening point was determined by the use of a Goodrich plastometer as described by Karrer, Davies and Dieterich, Industrial and Engineering Chemistry, Analytical Edition, 2, 96–99 (1930). On the plasticity curve (temperature v. softness) obtained according to the published method, the point at which the tangent to the curve had a slope of 60° was determined and the corresponding temperature was read on the temperature axis.

The molecular weight was determined as previously described herein.

The melt index was determined by ASTM Method D–1238–52T.

The tensile strength and the elongation were determined by ASTM. Method D–638–52T for the injection-molded samples and by ASTM D–412–51T for the compression-molded samples. The Shore hardness was determined by ASTM Method D–676–49T.

The flex temperature was determined by ASTM Method D–1043–51.

The impact strength was determined by ASTM Method D–256–47T.

The heat distortion was determined by ASTM Method D-648-45T.

The film properties were determined by methods previously cited herein.

As a general rule, the use of a stirred reactor and a suspended catalyst permits practical operation at lower temperatures and produces a relatively flexible polyethylene having a high molecular weight, whereas the use of a fixed or stationary catalyst mass often requires a higher temperature and produces a relatively brittle polyethylene having a relatively low molecular weight. Within the disclosed ranges, however, higher temperatures favor production of brittle polyethylene having relatively low molecular weight, and lower temperatures favor production of relatively flexible polyethylene having relatively high molecular weight. High catalyst activation temperatures favor lower molecular weights, and vice versa. Thus, even when a stirred reactor and a suspended catalyst are utilized, relatively brittle polyethylene (m. wt. 10,000–20,000) can be produced at temperatures in the range 350 to 450° F. and/or by using a catalyst which has been activated by heating in air at a temperature in the range 1100 to 1500° F. The same type of contacting technique conducted at a temperature in the range 200 to 350° F. with a catalyst activated at 900–1100° F. produces a relatively flexible polyethylene having a molecular weight in the range 20,000 to 200,000. Also, above 1 weight percent, low chromium content in the catalyst favors the formation of low molecular weight, brittle polymer, and high chromium content favors the formation of high molecular weight flexible polymer. High concentrations of monomer in the reaction zone favor production of high molecular weight polymer. With these factors in view, those skilled in the art can select the proper conditions for the production of polyethylene having the desired properties in any particular case.

*Example XIX*

Several materials were tested as supports for chromium oxide in runs wherein a solution of ethylene in 2,2,4-trimethylpentane was contacted with a fixed bed of catalyst under the conditions shown in the following tables.

The supports for the chromium oxide catalyst were prepared by the following method: (1) the major component was slurried with water in a ball mill for approximately 12 hours; (2) the resulting slurry was then milled together with the nitrate or the oxide of the minor components; (3) the resulting slurry was then milled with ammonium hydroxide; (4) the resulting mixture was dried at 180 to 250° F.; (5) the dried material was calcined at about 900–1000° F.; (6) the calcined material was again milled with water; (7) the resulting mixture was dried; (8) the dried material was calcined; (9) the resulting oxide material was formed into cylindrical pills; and (10) the pills were further calcined. In the case of the catalyst in which the major component of the support was silica, steps 5, 8, 9 and 10 of the foregoing procedure were omitted, and following step 7, the dried powder was extruded, calcined, and steam aged, as previously described herein, in connection with the discussion of the silica-alumina composites. The alumina used in the preparation of the catalyst was a commercial alumina trihydrate. The silica was a commercial silica hydrogel. The zirconia was a commercial high surface zirconia oxide.

Oxide mixtures wherein each of copper oxide, calcium oxide, zinc oxide, manganese trioxide,[3] cobalt trioxide, iron trioxide, tin dioxide, titanium dioxide, magnesium oxide, vanadium pentoxide, antimony trioxide, molybdenum trioxide, tungsten trioxide, and nickel oxide, was used as the sole support for the chromium oxide effected substantially no ethylene conversion under the conditions of the runs.

In the following tables, values in parentheses are estimated values.

[3] $Mn_2O_3$.

TABLE XXII

[Four-hour fixed-bed polymerization tests at 330° F. maximum temperature, 450 p.s.i.g., and 6 LHSV, 3.0 wt. percent ethylene, 1.2% ethane and 95.8% isooctane (recycled) feed over 100 ml. of pelleted catalyst. Catalysts prepared by impregnation of supports with 0.76 M $CrO_3$ solution and activation at 950° F. with dry air.]

| Catalyst | | | | Polymerization Tests— Average Ethylene Conv., Percent | Percent Ethylene Charged Going to— | | | | Isooctane Insoluble Polymer Properties | | | |
|---|---|---|---|---|---|---|---|---|---|---|---|---|
| Support | | Wt. Percent Cr | Bulk Density, g./cc. | | Unreacted Ethylene | Isooctane Soluble Polymer | Isooctane Insoluble Polymer (Recovered)[1] | Unaccounted for (Catalyst Deposits)[2] | Molecular Weight | Density at 20° C. | Melting Point, °F. | Falling Ball, Inches |
| Composition | Surface Area, m.²/g. | | | | | | | | | | | |
| 90% $SiO_2$—10% $Al_2O_3$ | (350) | 2.5 | 0.63 | 97 | 3.3 | 4.2 | 65.6 | 26.9 | 12,600 | 0.955 | 243 | 6 |
| 100% $SiO_2$ | | 2.53 | 0.49 | 93 | 6.8 | 2.7 | 55.0 | 35.5 | 17,000 | 0.952 | 243 | 6 |
| 100% $Al_2O_3$ | | 2.53 | 0.66 | 60 | 40.1 | 1.7 | 28.9 | 29.3 | 15,300 | 0.960 | 245 | [4]BIM |
| 90% $SiO_2$—10% CuO | 263 | 5.7 | 0.41 | 96 | 4.4 | 3.3 | 71.5 | 20.8 | 14,200 | 0.955 | 244 | 6 |
| 90% $SiO_2$—10% CaO | 166 | 5.2 | 0.52 | 91 | 9.0 | 2.9 | 63.7 | 24.4 | 16,400 | 0.951 | 243 | 6 |
| 90% $SiO_2$—10% ZnO | | 5.3 | (0.40) | 96 | 2.8 | 3.3 | 72.5 | 20.4 | 14,400 | 0.953 | 244 | BIM |
| 90% $SiO_2$—10% MgO | 287 | 3.9 | 0.49 | 91 | 9.5 | 2.9 | 65.2 | 22.4 | 22,200 | 0.959 | 246 | 12 |
| 90% $SiO_2$—10% SrO | | 5.8 | 0.40 | 96 | 3.6 | 3.7 | 83.3 | 9.4 | 14,500 | 0.952 | 245 | 6 |
| 90% $SiO_2$—10% BaO | | 5.2 | (0.40) | 93 | 6.8 | 2.9 | 70.8 | 19.5 | 12,100 | 0.952 | 243 | BIM |
| 90% $SiO_2$—10% $B_2O_3$ | | 3.8 | 0.46 | 85 | 15.3 | 3.1 | 60.0 | 21.6 | 11,100 | 0.961 | 246 | BIM |
| 90% $SiO_2$—10% $ThO_2$ | | 4.4 | 0.42 | 79 | 21.1 | 1.5 | 56.5 | 20.9 | 13,700 | 0.960 | 244 | 6 |
| 90% $SiO_2$—10% $WO_3$ | | 3.5 | 0.55 | 95 | 5.0 | 4.0 | 66.7 | 24.3 | 14,300 | 0.958 | 245 | BIM |
| 90% $SiO_2$—10% $MN_2O_3$ | | 5.2 | 0.40 | 97 | 3.1 | 2.7 | 74.6 | 19.6 | 12,900 | 0.960 | 244 | BIM |
| 90% $SiO_2$—10% $Co_2O_3$ | | 5.0 | 9.45 | 98 | 2.3 | 1.7 | [5]48.5 | 47.5 | 16,500 | 0.965 | 245 | BIM |
| 90% $SiO_2$—10% $Fe_2O_3$ | | 4.8 | 0.40 | 95 | 4.8 | 2.5 | 71.0 | 21.7 | 14,600 | 0.956 | 246 | BIM |
| 90% $Al_2O_3$—10% CuO | 164 | 2.2 | 0.82 | 10 | 90.5 | 0.2 | 4.8 | 4.5 | 20,600 | | | |
| 90% $Al_2O_3$—10% CaO | 140 | 2.6 | 0.68 | 58 | 42.0 | 1.3 | 23.7 | 33.0 | 16,600 | 0.962 | 246 | 6 |
| 90% $Al_2O_3$—10% ZnO | 138 | 1.6 | 0.85 | 74 | 26.2 | 1.5 | 37.9 | 34.4 | 11,300 | 0.965 | 246 | 6 |
| 90% $Al_2O_3$—10% MgO | 157 | 2.1 | 0.89 | 74 | 26.2 | 2.5 | 37.9 | 33.4 | 14,400 | 0.958 | 245 | 6 |
| 90% $Al_2O_3$—10% SrO | 146 | 2.2 | 0.98 | 75 | 25.4 | 3.3 | 38.1 | 33.2 | 18,100 | 0.954 | 245 | 6 |
| 90% $Al_2O_3$—10% BaO | 154 | 2.2 | 0.89 | 79 | 21.2 | 2.5 | 40.6 | 35.7 | 14,700 | 0.958 | 246 | BIM |
| 90% $Al_2O_3$—10% $B_2O_3$ | 210 | 1.9 | 0.87 | 82 | 18.3 | 1.7 | 35.0 | 45.0 | 21,400 | 0.963 | 247 | 12 |
| 90% $Al_2O_3$—10% $MoO_3$ | 188 | 2.0 | 0.90 | 49 | 51.0 | 1.2 | 13.8 | 34.0 | 12,600 | 0.967 | 247 | BIM |
| 90% $Al_2O_3$—10% $WO_3$ | | 2.0 | 0.86 | 74 | 25.8 | 2.3 | 47.3 | 24.6 | 21,700 | | 246 | 12 |
| 90% $Al_2O_3$—10% $Mn_2O_3$ | 176 | 2.5 | 0.78 | 64 | 35.9 | 1.7 | 29.4 | 33.0 | 13,900 | 0.963 | 245 | BIM |
| 90% $Al_2O_3$—10% $Co_2O_3$ | 160 | 1.9 | 0.93 | 82 | 18.5 | 3.3 | 49.8 | 28.4 | 22,400 | 0.966 | 248 | 18 |
| 90% $Al_2O_3$—10% $Fe_2O_3$ | 166 | 2.6 | 0.76 | 56 | 43.7 | 1.3 | 26.2 | 28.8 | 14,900 | 0.964 | 246 | BIM |

[1] Reactor flushed at end of run with isooctane for one hour at 370° F.
[2] Most of unaccounted for ethylene charged was a heavy polymer which remained on the catalyst.
[3] Strength of impregnation solution adjusted to place 2.5% Cr on catalyst.
[4] BIM—broke in mold.
[5] Reactor outlet plugged at 4 hours on stream. Reactor not flushed.

TABLE XXIII

[Four-hour fixed-bed polymerization tests at 330° F. maximum temperatures, 450 p.s.i.g., and 6 LHSV, 3.0 wt. percent ethylene, 0.8-1.2% ethane and 95.8-96.2% isooctane (recycled) feed over 100 ml. of pelleted catalyst. Catalyst prepared by impregnation of supports with 0.76 M $CrO_3$ solution and activation at 950° F. with dry air.]

| Catalyst | | | | Polymerization Tests—Average Ethylene Conv., Percent | Percent Ethylene Charged Going to— | | | | Isooctane Insoluble Polymer Properties | | | |
|---|---|---|---|---|---|---|---|---|---|---|---|---|
| Support | | Wt. Percent $Cr^1$ | Bulk Density, g./cc. | | Unreacted Ethylene | Isooctane Soluble Polymer | Isooctane Insoluble Polymer (Recovered) | Unaccounted for (Catalyst Deposits) | Molecular Weight | Density at 20° C. | Melting Point, °F. | Falling Ball, Inches |
| Composition | Surface Area, m.²/g. | | | | | | | | | | | |
| 90% $SiO_2$—10% $Al_2O_3$ | (350) | 2.5 | 0.60 | 96 | 4.2 | 3.1 | 65.2 | 27.5 | 16,000 | 0.953 | 246 | 6 |
| 100% $SiO_2$ | 725 | 3.0 | 0.55 | ² 79 | 21.2 | 0.8 | 39.6 | 38.4 | 23,000 | ⁵ 0.980 | 248 | 18 |
| 100% $Al_2O_3$ | | 2.5 | 0.70 | 63 | 37.5 | 1.7 | 28.8 | 32.0 | 15,900 | 0.963 | 246 | 6 |
| 100% $ThO_2$ | 21 | 0.8 | 1.75 | 83 | 17.0 | 1.7 | 52.1 | 29.2 | 15,400 | 0.964 | 249 | 6 |
| 90% $SiO_2$—10% $Sb_2O_3$ | 314 | 4.6 | 0.41 | 91 | 9.1 | 2.3 | 73.3 | 15.3 | 16,100 | 0.960 | 246 | 6 |
| 90% $SiO_2$—10% $TiO_2$ | 255 | 3.8 | 0.50 | 99 | 1.4 | 2.3 | 64.4 | 31.9 | 14,200 | 0.959 | 247 | BIM |
| 90% $SiO_2$—10% $SnO_2$ | 484 | 2.0 | 0.67 | 91 | 9.4 | 2.9 | 53.3 | 34.4 | 15,400 | 0.961 | 249 | BIM |
| 90% $SiO_2$—10% $V_2O_5$ | 226 | 3.3 | 0.56 | 78 | 21.9 | 3.2 | 43.6 | 31.3 | 11,800 | 0.963 | 247 | BIM |
| 90% $SiO_2$—10% $MoO_3$ | 33 | 4.3 | 0.40 | ³ 41 | 58.8 | 1.0 | 31.2 | 9.0 | 14,000 | 0.959 | 248 | BIM |
| 90% $SiO_2$—10% NiO | 339 | 3.6 | 0.41 | 96 | 4.5 | 2.7 | 58.7 | 34.1 | 19,000 | 0.955 | 247 | 12 |
| 90% $SiO_2$—10% $CeO_2$ | 276 | 4.2 | 0.48 | 89 | 10.8 | 2.1 | 66.0 | 21.1 | 15,600 | 0.959 | 246 | 6 |
| 90% $Al_2O_3$—10% CuO | 156 | 1.9 | 0.87 | 24 | 76.2 | 0.6 | 6.7 | 16.5 | 15,200 | | 249 | |
| 90% $Al_2O_3$—10% $Sb_2O_3$ | 195 | 1.8 | 0.87 | 83 | 17.1 | 1.0 | 41.3 | 40.6 | 15,800 | 0.965 | 247 | 6 |
| 90% $Al_2O_3$—10% $TiO_2$ | 155 | 2.4 | 0.85 | 70 | 30.0 | 1.7 | 37.0 | 31.3 | 14,900 | 0.959 | 249 | 6 |
| 90% $Al_2O_3$—10% $SnO_2$ | 121 | 1.6 | 0.90 | 75 | 25.5 | 1.9 | 54.0 | 18.6 | 15,200 | 0.965 | 248 | BIM |
| 90% $Al_2O_3$—10% $ThO_2$ | 156 | 2.4 | 1.00 | 86 | 14.0 | 2.1 | 46.2 | 37.7 | 16,700 | 0.960 | 246 | 12 |
| 90% $Al_2O_3$—10% $V_2O_5$ | 175 | 2.0 | 0.87 | ⁴ 26 | 73.6 | 4.8 | 4.8 | 21.6 | | | | |
| 90% $Al_2O_3$—10% NiO | 175 | 2.2 | 0.90 | 83 | 17.4 | 0.8 | 38.8 | 43.0 | 18,000 | 0.972 | 247 | 12 |
| 90% $Al_2O_3$—10% $CoO_2$ | 162 | 1.8 | 0.82 | 61 | 38.9 | 1.1 | 30.2 | 29.8 | 14,100 | 0.962 | 246 | 6 |
| Platinum Reforming Catalyst (0.4 wt. percent Pt, 0.25 wt. percent F, 0.25 wt. percent Cl, remainder $Al_2O_3$ gel) | 193 | 4.3 | 0.53 | 47 | 53.2 | 1.0 | 12.5 | 33.3 | 9,300 | 0.969 | 248 | 12 |

¹ Calculated from absorption capacity of catalyst.
² Catalyst was overheated (475° F.) while in contact with isooctane during start-up.
³ Catalyst had low surface area.
⁴ Two-hour run. Most of the converted ethylene remained on the catalyst.
⁵ Contained some catalyst.

TABLE XXIV

[Fixed-bed polymerization tests at 330° F. maximum temperature, 450 p.s.i.g., and 6 LHSV, 3.0 wt. percent ethylene 1-3% ethane and 94-96% isooctane (recycled) feed over 100 ml. of pelleted catalyst. Catalyst prepared by impregnation of support with 0.76 M $CrO_3$ solution and activation at 950° F. with dry air.]

| Catalyst | | | | Polymerization Test | | Percent Ethylene Charged Going to— | | | | Isooctane Insoluble Polymer Properties | | | |
|---|---|---|---|---|---|---|---|---|---|---|---|---|---|
| Support | | Wt. Percent Cr | Bulk Density, g./cc. | Length of Test, Hours | Average Ethylene Conv., Percent | Unreacted Ethylene | Isooctane Soluble Polymer | Isooctane Insoluble Polymer (Recovered) | Unaccounted for (Catalyst Deposit) | Molecular Weight | Density at 20° C. | Melting Point, °F. | Falling Ball, Inches |
| Composition | Surface Area, m.²/g. | | | | | | | | | | | | |
| 90% $ZrO_2$—10% CuO | 6 | 0.6 | 1.73 | 2 | 7 | | | | | | | | |
| 90% $ZrO_2$—10% CaO | 6 | 0.6 | 1.69 | 2 | 8 | | | | | | | | |
| 90% $ZrO_2$—10% ZnO | 5 | (0.6) | 2.23 | 4 | 10 | | | | | | | | |
| 90% $ZrO_2$—10% MgO | 12 | 0.4 | 2.39 | 4 | 26 | 74.3 | 0.5 | 10.8 | 14.4 | 13,200 | 0.959 | 247 | BIM |
| 90% $ZrO_2$—10% SrO | 6 | 0.6 | 1.66 | 2 | 8 | | | | | | | | |
| 90% $ZrO_2$—10% $Sb_2O_3$ | 6 | 0.5 | 1.71 | 2 | 7 | | | | | | | | |
| 90% $ZrO_2$—10% BaO | 8 | 0.6 | 1.94 | 4 | 58 | 42.0 | 0.2 | 33.8 | 24.0 | 16,700 | 0.963 | 246 | 6 |
| 90% $ZrO_2$—10% $B_2O_3$ | 2 | 0.9 | 1.35 | 2 | 5 | | | | | | | | |
| 90% $ZrO_2$—10% $TiO_2$ | 13 | 0.7 | 1.69 | 4 | 16 | 84.0 | 0.4 | 7.7 | 7.9 | 10,400 | 0.974 | 247 | BIM |
| 90% $ZrO_2$—10% $SnO_2$ | 5 | 0.7 | 1.65 | 4 | 15 | | | | | | | | |
| 90% $ZrO_2$—10% $ThO_2$ | 9 | 0.6 | 1.88 | 4 | 21 | 79.0 | 0.4 | 7.5 | 13.1 | 10,600 | 0.969 | 244 | BIM |
| 90% $ZrO_2$—10% $V_2O_5$ | 4 | 0.6 | 1.78 | 2 | 11 | | | | | | | | |
| 90% $ZrO_2$—10% $MoO_3$ | 3 | 0.6 | 1.95 | 2 | 5 | | | | | | | | |
| 90% $ZrO_2$—10% $WO_3$ | 6 | 0.6 | 1.92 | 4 | 7 | | | | | | | | |
| 90% $ZrO_2$—10% $Mn_2O_3$ | 7 | 1.1 | 1.77 | 2 | 12 | | | | | | | | |
| 90% $ZrO_2$—10% $Co_2O_3$ | 10 | 0.5 | 1.94 | 4 | 38 | 62.0 | 0.6 | 17.3 | 20.1 | 9,800 | 0.970 | 245 | BIM |
| 90% $ZrO_2$—10% $Fe_2O_3$ | 8 | 0.7 | 1.80 | 4 | 17 | | | | | | | | |
| 90% $ZrO_2$—10% NiO | 10 | 0.6 | 1.60 | 4 | 17 | 83.5 | 0.4 | 9.0 | 7.1 | 9,400 | 0.970 | 244 | BIM |
| 90% $ZrO_2$—10% $CeO_2$ | 14 | 0.7 | 1.82 | 4 | 20 | 80.0 | 0.5 | 9.9 | 9.6 | 12,100 | 0.965 | 242 | BIM |
| 100% $ZrO_2$ | 10 | 0.5 | 1.95 | 4 | 24 | 76.0 | 0.4 | 11.3 | 12.3 | 8,600 | 0.968 | 244 | |
| 100% $ZrO_2$ | 35 | 0.3 | 1.90 | 4 | 45 | 55.0 | 0.4 | 28.3 | 16.3 | 13,600 | 0.966 | 248 | BIM |
| 90% $SiO_2$—10% $Al_2O_3$ | 574 | 3.9 | 0.55 | 4 | 95 | 4.8 | 3.9 | 63.8 | 27.5 | 14,100 | 0.953 | 245 | 6 |
| 90% $Al_2O_3$—10% $SiO_2$ | 263 | 2.5 | 0.76 | 4 | 97 | 2.9 | 1.6 | 73.4 | 22.1 | 16,400 | 0.951 | 243 | BIM |
| Activated Carbon ¹ | 536 | 0.5 | 0.38 | 4 | 64 | 36.0 | 2.3 | 13.5 | 48.2 | 6,800 | 0.957 | 240 | BIM |

¹ Contained 13% silica and 5% alumina as impurities.

TABLE XXV

[Fixed-bed polymerization tests at 330° F. maximum temperature, 450 p.s.i.g., and 6 LHSV, 3.0 wt. percent ethylene, 3% ethane, and 94% isooctane (recycled) feed over 100 ml. of pelleted catalyst. Catalyst prepared by impregnation of support with 0.76 M CrO₃ solution and activation with dry air at 950° F.]

| Catalyst | | | | Polymerization Test | | Percent Ethylene Charged Going to— | | | | Isooctane Insoluble Polymer Properties | | | |
|---|---|---|---|---|---|---|---|---|---|---|---|---|---|
| Support | | Wt. Percent Cr | Bulk Density, g./cc. | Length of Test, Hours | Average Ethylene Conv., Percent | Unreacted Ethylene | Isooctane Soluble Polymer | Isooctane Insoluble Polymer (Recovered) | Unaccounted for (Catalyst Deposit) | Molecular Weight | Density at 20° C. | Melting Point, ° F. | Falling Ball, Inches |
| Composition | Surface Area, m.²/g. | | | | | | | | | | | | |
| 90% SiO₂—10% Al₂O₃ | | 2.5 | 0.61 | 4 | 91 | 8.6 | 3.5 | 66.4 | 21.5 | 13,300 | 0.953 | 247 | |
| 100% ThO₂ | 21 | 0.8 | 1.75 | 4 | 83 | 17.0 | 1.7 | 52.1 | 29.2 | 15,400 | 0.964 | 249 | 6 |
| 90% ThO₂—10% CuO | 55 | 0.6 | 2.29 | 2 | 6 | | | | | | | | |
| 90% ThO₂—10% CaO | 56 | 0.6 | 2.25 | 4 | 34 | 65.9 | 0.6 | 19.8 | 13.7 | 7,400 | 0.963 | 245 | BIM |
| 90% ThO₂—10% ZnO | 70 | 0.6 | 2.40 | 4 | 27 | 72.8 | 1.2 | 8.8 | 17.2 | 12,200 | 0.958 | 245 | BIM |
| 90% ThO₂—10% MgO | 71 | 0.6 | 2.24 | 4 | 16 | | | | | | | | |
| 90% ThO₂—10% SrO | 50 | 0.5 | 2.37 | 4 | 25 | 75.4 | 0.2 | 4.0 | 20.4 | 8,100 | 0.969 | 249 | |
| 90% ThO₂—10% Sb₂O₃ | 60 | 0.6 | 2.02 | 4 | 19 | 81.2 | 0.4 | 2.1 | 16.3 | 8,100 | 0.981 | 248 | |
| 90% ThO₂—10% BaO | 52 | 0.4 | 2.35 | 4 | 28 | 72.1 | 0.2 | 4.2 | 23.5 | 8,200 | 0.971 | 247 | BIM |
| 90% ThO₂—10% B₂O₅ | 40 | 0.5 | 2.01 | 4 | 22 | 78.1 | 0.8 | 15.0 | 6.1 | 9,000 | 0.973 | 248 | |
| 90% ThO₂—10% TiO₂ | 64 | 0.8 | 1.95 | 4 | 60 | 40.0 | 1.2 | 33.4 | 25.4 | 10,200 | 0.967 | 249 | BIM |
| 90% ThO₂—10% SnO₂ | 67 | 0.8 | 1.87 | 4 | 64 | 36.2 | 0.6 | 30.8 | 32.4 | 12,200 | 0.966 | 248 | 6 |
| 90% ThO₂—10% V₂O₅ | 36 | 0.7 | 2.06 | 4 | 4 | | | | | | | | |
| 90% ThO₂—10% MoO₃ | 74 | 0.7 | 2.34 | 4 | 83 | 36.8 | 1.9 | 40.8 | 20.5 | 19,700 | 0.965 | 248 | 6 |
| 90% ThO₂—10% WO₃ | 54 | 0.7 | 2.09 | 2 | 11 | | | | | | | | |
| 90% ThO₂—10% Mn₂O₃ | 63 | 0.6 | 2.06 | 2 | 9 | | | | | | | | |
| 90% ThO₂—10% Co₂O₃ | 56 | 0.6 | 2.19 | 4 | 63 | 37.3 | 0.6 | 35.6 | 26.5 | 19,800 | 0.965 | 249 | 12 |
| 90% ThO₂—10% Fe₂O₃ | 84 | 0.7 | 1.88 | 4 | 32 | 68.0 | 0.4 | 17.3 | 14.3 | 9,800 | 0.967 | 246 | BIM |
| 90% ThO₂—10% NiO | 74 | 0.6 | 2.22 | 4 | 58 | 42.3 | 0.4 | 30.4 | 26.9 | 22,200 | 0.959 | 251 | |
| 90% ThO₂—10% CeO₂ | 63 | 0.6 | 2.06 | 4 | 41 | 58.8 | 0.8 | 23.7 | 16.7 | 17,700 | 0.965 | 250 | 6 |

The foregoing data show that silica, alumina, thoria and zirconia are particularly desirable as supports for a chromium oxide catalyst according to this invention. It will be recognized by those skilled in the art that the term "support," as used herein, is not limited to inactive materials. Indeed, the foregoing data show that there are oxides which, when mixed with chromium oxide, do not form an active catalyst for the purposes of this invention, and that others, notably silica, alumina, zirconia, and thoria, contribute or enhance catalytic activity.

It will also be noted that the activity of a catalyst can be varied by the use of additional oxides in admixture with the silica, alumina, zirconia and/or thoria. It will be further noted that a given auxiliary oxide in the support increases the activity in the presence of certain of the main support components and does not in the presence of others. Thus, copper oxide, zinc oxide, strontium oxide, tungsten oxide, manganese trioxide, cobalt trioxide and iron trioxide increased the activity of the catalyst in which silica was the sole support. Zinc oxide, magnesium oxide, strontium oxide, barium oxide, boron oxide, tungsten oxide, manganese trioxide and cobalt trioxide increased the activity of the alumina-base catalyst. Barium oxide increased the activity of the zirconia-base catalyst, and none of the additional oxide supports tested together with thoria produced any increase in the activity of the catalyst. From the foregoing data, those skilled in the art can select catalysts having the desired activity for a desired application. Strontium oxide confers special properties on the catalyst, as more fully set forth in our co-pending application Serial No. 433,804, filed June 1, 1954, now U.S. Patent No. 2,846,425.

Example XX

Effects of reaction pressure on reaction rate and on certain polymer properties in the polymerization of ethylene according to our process are shown in Table XXVI. The data were obtained in two-hour runs in a one-liter, batch-type, stirred reactor at 285° F. Purified cyclohexane was utilized as a diluent. The catalyst contained 2.5 weight per cent chromium as oxide deposited on a commercial microspheroidal silica-alumina and had been activated by heating in dry air (dew point below 0° F.) at 950° F. for five hours. The silica:alumina weight ratio in the catalyst was approximately 8:1.

TABLE XXVI

| Reaction Pressure, p.s.i.g. | Cat. Conc. in Solvent, wt. Percent | Reaction Rate, g./g./hr. | Mol Wt. from Inherent Viscosity | Melt Index | Izod Impact ¼ x ½ bar |
|---|---|---|---|---|---|
| 100 | 0.39 | 13 | 34,300 | 2.8 | 0.9 |
| 200 | 0.23 | 83 | 39,000 | 1.4 | 2.3 |
| 300 | 0.15 | 220 | 38,300 | 0.72 | 4.8 |
| 450 | 0.06 | 440 | 45,600 | 0.59 | 7.2 |
| 700 | 0.07 | 320 | 46,500 | 0.46 | 9.5 |
| 800 | 0.07 | 450 | 48,900 | 0.38 | 11.1 |
| 900 | 0.06 | 340 | 49,000 | 0.41 | 9.5 |

The above reaction rates are in terms of grams of polymer produced per gram of catalyst per hour.

The data show that reaction rate increased with pressure up to 450 p.s.i.g. Above this pressure, the reaction rate data were erratic, probably because of the low catalyst concentrations utilized. The catalyst concentrations at the higher pressures were maintained low in this particular group of runs in order to facilitate the removal of the liberated heat, which was relatively high at the higher pressures. The data also illustrate the fact that at a constant temperature and in the presence of a particular catalyst, increased pressure results in increased molecular weight.

The density and the melting point of the polyethylenes were substantially unaffected by pressure change within the range shown in Table XXXI.

From the foregoing, it will be seen that pressures as high as 1000 p.s.i. can be satisfactorily used in our process. Pressures of from 700 up to as high as 2000 p.s.i. or higher can be used if desired. However, as a general rule, pressures above 1000 p.s.i. are not essential for the obtainment of satisfactory results.

Water, oxygen, carbon monoxide, and most compounds of sulfur, of oxygen, of nitrogen, and of halogens act as poisons for the catalysts of this invention. Therefore the concentration of these materials in the feed should not exceed 1000 parts per million and preferably should not exceed 100 parts per million. More preferably, they should be entirely excluded. Water can be removed by lowering the dew point of the feed gas, for example, to 0° F. or lower, by refrigeration or by contact with a dehydrating agent, such as silica gel. Oxygen can be removed by adsorption or by reaction with a metal such as copper. Carbon monoxide can be removed by absorption or selective oxidation. The diluent can be purified by hydrogenation or fractionation. The above removal methods are well known in the art.

Catalyst regeneration gas or activation gas should be non-reducing and, preferably, free from sulfur and halogen as well as from nitrogen compounds. From 1 to 25 weight percent oxygen can be present in the regeneration gas, and up to 100 percent in the activation gas. Compounds which form carbonaceous deposits should be absent.

As will be evident to those skilled in the art, many variations and modifications can be practiced within the scope of the disclosure and claims to this invention.

We claim:

1. A process for the preparation of an improved catalyst, which process comprises depositing chromium oxide on a support component selected from the group consisting of silica, alumina, zirconia, and thoria, heating the resulting composite at an elevated temperature, under substantially anhydrous conditions, and for a sufficient time to impart, to the resulting mixture, increased catalytic activity for promoting the formation of normally solid polymers of olefins, the resulting catalyst containing at least part of the chromium in the hexavalent state.

2. In a process for the activation of a catalyst comprising a support component selected from the group consisting of silica, alumina, zirconia and thoria and chromium oxide supported thereon by heating at an elevated temperature for a sufficient time to impart solid polymer forming activity to said catalyst and leave at least part of the chromium in the hexavalent state, the improvement which comprises conducting the heating under substantially anhydrous conditions.

3. In a process for the activation of a catalyst comprising a support component selected from the group consisting of silica, alumina, zirconia and thoria and chromium oxide supported thereon by heating at an elevated temperature for a sufficient time to impart solid polymer forming activity to said catalyst and leave at least part of the chromium in the hexavalent state, the improvement which comprises conducting the heating under substantially anhydrous conditions in a nonreducing atmosphere having a dew point below 75° F.

4. In a process for the activation of a catalyst comprising a support component selected from the group consisting of silica, alumina, zirconia and thoria and chromium oxide supported thereon by heating at an elevated temperature for a sufficient time to impart solid polymer forming activity to said catalyst and leave at least part of the chromium in the hexavalent state, the improvement which comprises conducting the heating under substantially anhydrous conditions in an oxygen-containing atmosphere having a dew point below 0° F.

5. In a process for the activation of a catalyst comprising a support component selected from the group consisting of silica, alumina, zirconia and thoria and chromium oxide supported thereon by heating at an elevated temperature for a sufficient time to impart solid polymer forming activity to said catalyst and leave at least part of the chromium in the hexavalent state, the improvement which comprises conducting the heating in air having a dew point below 0° F.

6. A process for manufacturing a chromium oxide-containing supported polymerization catalyst which comprises impregnating at least one member of the group consisting of alumina, silica, zirconia, and thoria with an aqueous solution of chromium compound convertible to oxide upon heating so as to deposit an amount of chromium on said member in the range of 0.1 to 10 weight percent of the resulting composite, drying the same and calcining said composite in dry air at a temperature in the range of 750 to 1500° F. so as to convert said compound to chromium oxide in which at least a portion of the chromium is hexavalent.

7. The process of claim 6 in which the impregnating solution is a solution of $CrO_3$.

8. A process for manufacturing a polymerization catalyst which comprises impregnating a silica-alumina gel in which the silica is a major ingredient with an aqueous solution of a chromium compound convertible to the oxide upon heating so as to deposit at least 0.1 weight percent of chromium on said gel, drying the resulting impregnated gel and calcining the dried gel in dry air at a temperature in the range of 750 to 1500° F. so as to leave a substantial portion of the chromium in hexavalent form.

9. The process of claim 8 in which the calcination is effected at a temperature in the range of 1300 to 1500° F.

10. The process of claim 8 in which the impregnating solution is a solution of chromium nitrate.

11. The process of claim 8 in which the impregnating solution is a solution of $CrO_3$.

12. A process for manufacturing a polymerization catalyst which comprises impregnating a silica-alumina gel in which the silica is a major ingredient with an aqueous solution of a chromium compound selected from the group consisting of chromium trioxide and chromic nitrate to deposit from 0.1 to 10 weight percent, based on the total weight of finished catalyst, of chromium on said gel, drying the resulting impregnated gel, and calcining the dry gel, in air having a dew point below 75° F., at a temperature in the range 750 to 1500° F. for a period of time in the range 1 second at the highest temperatures in said range to 50 hours at the lowest temperatures in said range, to leave at least 0.1 weight percent, based on total catalyst, of chromium in the hexavalent state.

13. A process according to claim 12 wherein the air has a dew point of less than 0° F. and said calcining is conducted for a period in the range 3 to 10 hours.

References Cited in the file of this patent

UNITED STATES PATENTS 2,401,246    Hull _____ May 28, 1946

FOREIGN PATENTS 751,859    Great Britain _____ July 4, 1956